US007500260B2

(12) United States Patent
Lupoi et al.

(10) Patent No.: US 7,500,260 B2
(45) Date of Patent: Mar. 3, 2009

(54) MOTION VIDEO INDEXING MECHANISM FOR ATHLETE RECRUITING ARCHITECTURE

(75) Inventors: John Lupoi, Walnut Creek, CA (US); Denae Theder, Orinda, CA (US); Mark Jordan, Campbell, CA (US); Ollan Agtual, Concord, CA (US); Will Law, San Francisco, CA (US)

(73) Assignee: D1Athletes.com, Inc., Campbell, CA (US)

( * ) Notice: Subject to any disclaimer, the term of this patent is extended or adjusted under 35 U.S.C. 154(b) by 841 days.

(21) Appl. No.: 10/753,655

(22) Filed: Jan. 7, 2004

(65) Prior Publication Data

US 2005/0149976 A1    Jul. 7, 2005

(51) Int. Cl.
*H04N 5/445* (2006.01)
*G06F 3/00* (2006.01)
*G06F 13/00* (2006.01)

(52) U.S. Cl. ............................ 725/53; 725/136; 725/52; 725/115; 725/131; 725/133; 725/141; 725/139; 707/104.1; 707/1; 707/2; 707/3; 707/4; 707/5; 707/6; 707/7; 707/8; 707/9; 707/10; 705/1; 705/10; 705/11; 705/26

(58) Field of Classification Search ................. 725/136, 725/52–53, 115, 131, 133, 141, 139; 707/104.1, 707/1–10; 705/1, 10–11, 26
See application file for complete search history.

(56) References Cited

U.S. PATENT DOCUMENTS 5,815,155 A     9/1998   Wolfston, Jr.
6,631,522 B1 *  10/2003  Erdelyi ........................ 725/53

(Continued)

OTHER PUBLICATIONS

NCAA, "Compliance Assistant Software", 1st Edition, Jul. 2001, 135 pages.

(Continued)

*Primary Examiner*—Jason P Salce
(74) *Attorney, Agent, or Firm*—Hickman Palermo Truong & Becker LLP; Christian A. Nicholes

(57) ABSTRACT

An athlete recruiting architecture is disclosed. The athlete recruiting system allows a recruiting entity, such as a school, to search for and find athletes that satisfy recruiting entity-specified criteria. The athlete recruiting system also allows motion videos to be associated with athletes. These motion videos may be uploaded or streamed to interested recruiting entities over a communication network. The athlete recruiting system provides a video indexing mechanism that allows athletes and recruiting entities to generate and store indices to motion videos. The athlete recruiting system provides hit tracking mechanisms for notifying athletes about recruiting entities that have taken actions that indicate that the recruiting entities are interested in the athlete. As a result, athletes are encouraged to initiate contact with interested recruiting entities. This promotes the formation of relationships between athletes and recruiting entities while adhering to rules imposed on the recruiting process.

3 Claims, 12 Drawing Sheets

U.S. PATENT DOCUMENTS

| | | |
|---|---|---|
| 6,662,194 B1 | 12/2003 | Joao |
| 2001/0034734 A1 | 10/2001 | Whitley et al. |
| 2002/0010697 A1 | 1/2002 | Marshall et al. |
| 2002/0016791 A1 | 2/2002 | Palmer |
| 2003/0144989 A1 | 7/2003 | Schoemann |
| 2003/0218625 A1 | 11/2003 | Allison |
| 2003/0234787 A1 | 12/2003 | Hines et al. |
| 2004/0162803 A1 | 8/2004 | Rhoads |
| 2005/0044149 A1 | 2/2005 | Regardie et al. |
| 2005/0149989 A1 | 7/2005 | Lupoi et al. |
| 2005/0183114 A1 | 8/2005 | Lupoi et al. |

OTHER PUBLICATIONS

Wayback Machine, "Internet Archive Wayback Machine", www.web.archive.org, berecruited.com, Dec. 17, 2003, 12 pages.

Wayback Machine, "Internet Archive Wayback Machine", www.web.archive.org, nfl.com, Oct. 8, 1999, 5 pages.

* cited by examiner

300

302
IN AN ORGANIZATION'S SESSION, SEND BOTH (A) AN INDICATION OF A SET OF REQUIREMENTS THAT ARE ASSOCIATED WITH A FIRST TEAM POSITION AND (B) AN INDICATION OF A SET OF REQUIREMENTS THAT ARE ASSOCIATED WITH A SECOND TEAM POSITION

304
IN THE ORGANIZATION'S SESSION, SEND A FORM THAT INCLUDES A SEPARATE INPUT FIELD FOR EACH REQUIREMENT IN A FIRST SET OF REQUIREMENTS AND EACH REQUIREMENT IN A SECOND SET OF REQUIREMENTS

306
IN THE ORGANIZATION'S SESSION, RECEIVE BOTH THE FIRST SET OF REQUIREMENTS AND THE SECOND SET OF REQUIREMENTS

308
BASED ON THE FIRST SET OF REQUIREMENTS, UPDATE A FIRST SET OF VALUES THAT ARE ASSOCIATED WITH BOTH THE ORGANIZATION AND THE FIRST TEAM POSITION

310
BASED ON THE SECOND SET OF REQUIREMENTS, UPDATE A SECOND SET OF VALUES THAT ARE ASSOCIATED WITH BOTH THE ORGANIZATION AND THE SECOND TEAM POSITION

402
FOR EACH ATHLETE IN A SET OF ATHLETES, STORE A SEPARATE SET OF VALUES ASSOCIATED WITH THAT ATHLETE

404
STORE, IN A DATABASE, A FIRST SET OF REQUIREMENTS THAT ARE ASSOCIATED WITH BOTH AN ORGANIZATION AND A FIRST TEAM POSITION

406
STORE, IN THE DATABASE, A SECOND SET OF REQUIREMENTS THAT ARE ASSOCIATED WITH BOTH THE ORGANIZATION AND A SECOND TEAM POSITION

408
IN THE ORGANIZATION'S SESSION, RECEIVE A REQUEST TO LIST ATHLETES

410
READ THE FIRST SET OF REQUIREMENTS FROM THE DATABASE

412
FROM THE SET OF ATHLETES, SELECT A FIRST SUBSET OF ATHLETES THAT SATISFY THE FIRST SET OF REQUIREMENTS

414
READ THE SECOND SET OF REQUIREMENTS FROM THE DATABASE

416
FROM THE SET OF ATHLETES, SELECT A SECOND SUBSET OF ATHLETES THAT SATISFY THE SECOND SET OF REQUIREMENTS

418
IN THE ORGANIZATION'S SESSION, SEND A NOTIFICATION THAT INDICATES THE FIRST SUBSET AND THE SECOND SUBSET

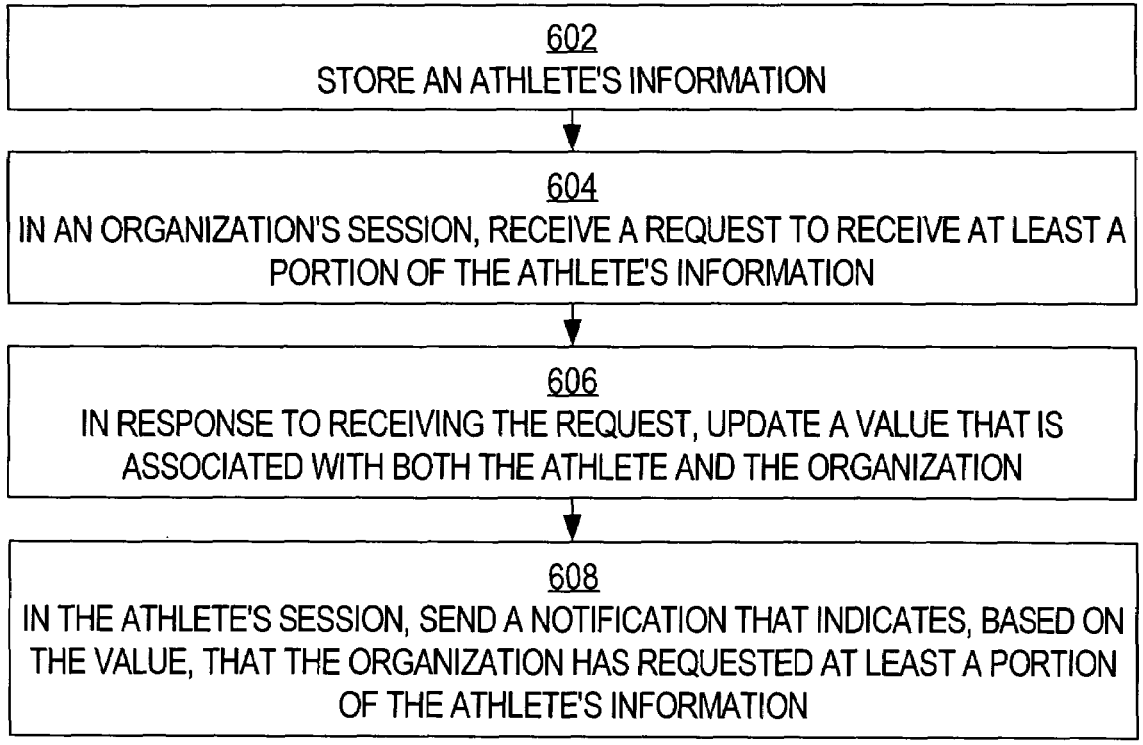
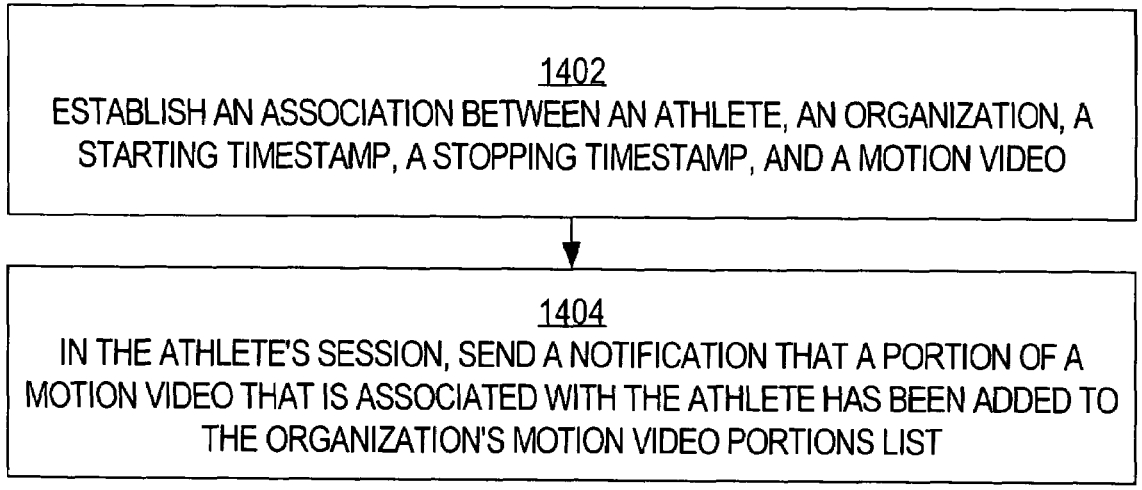

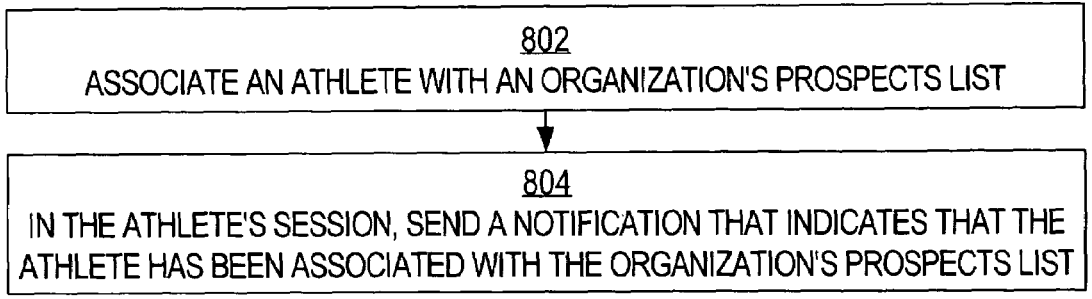

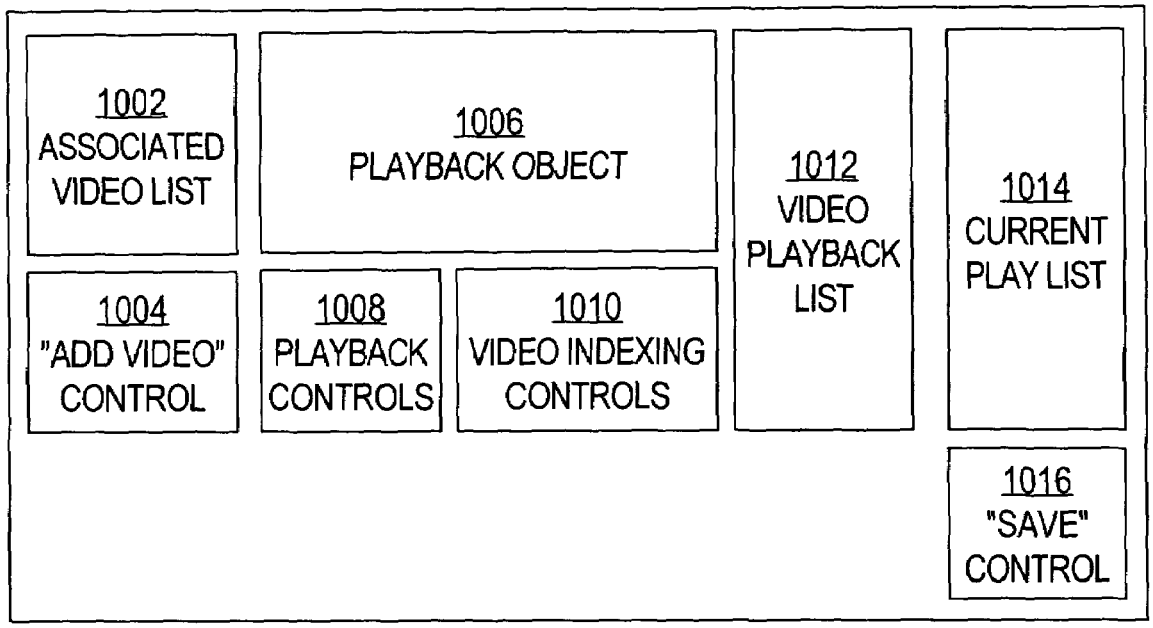
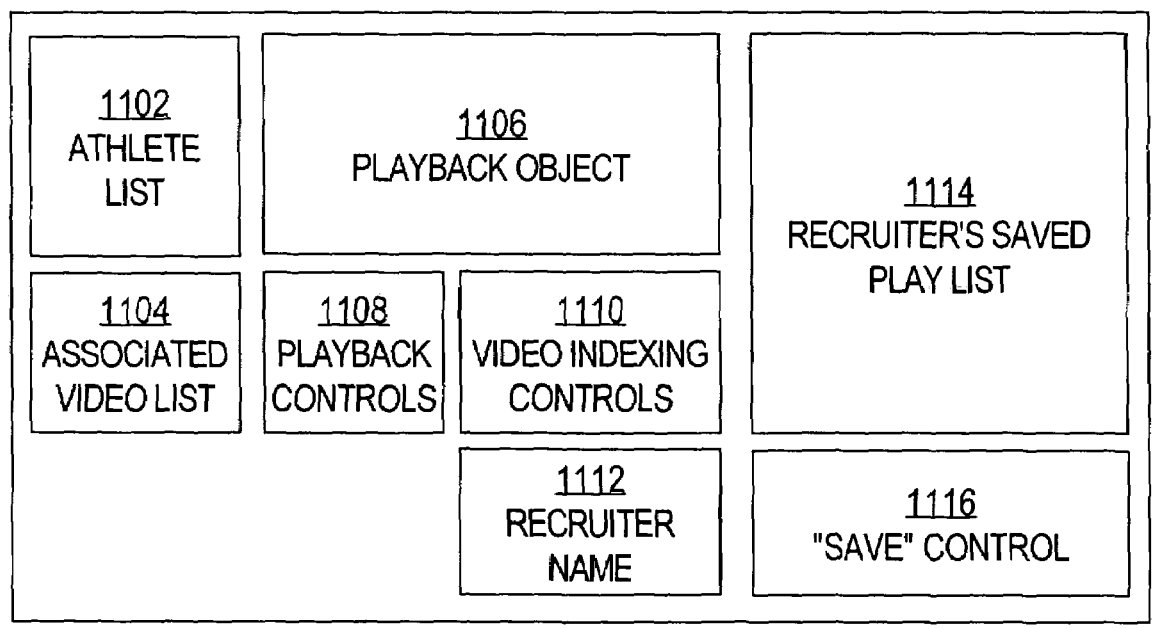

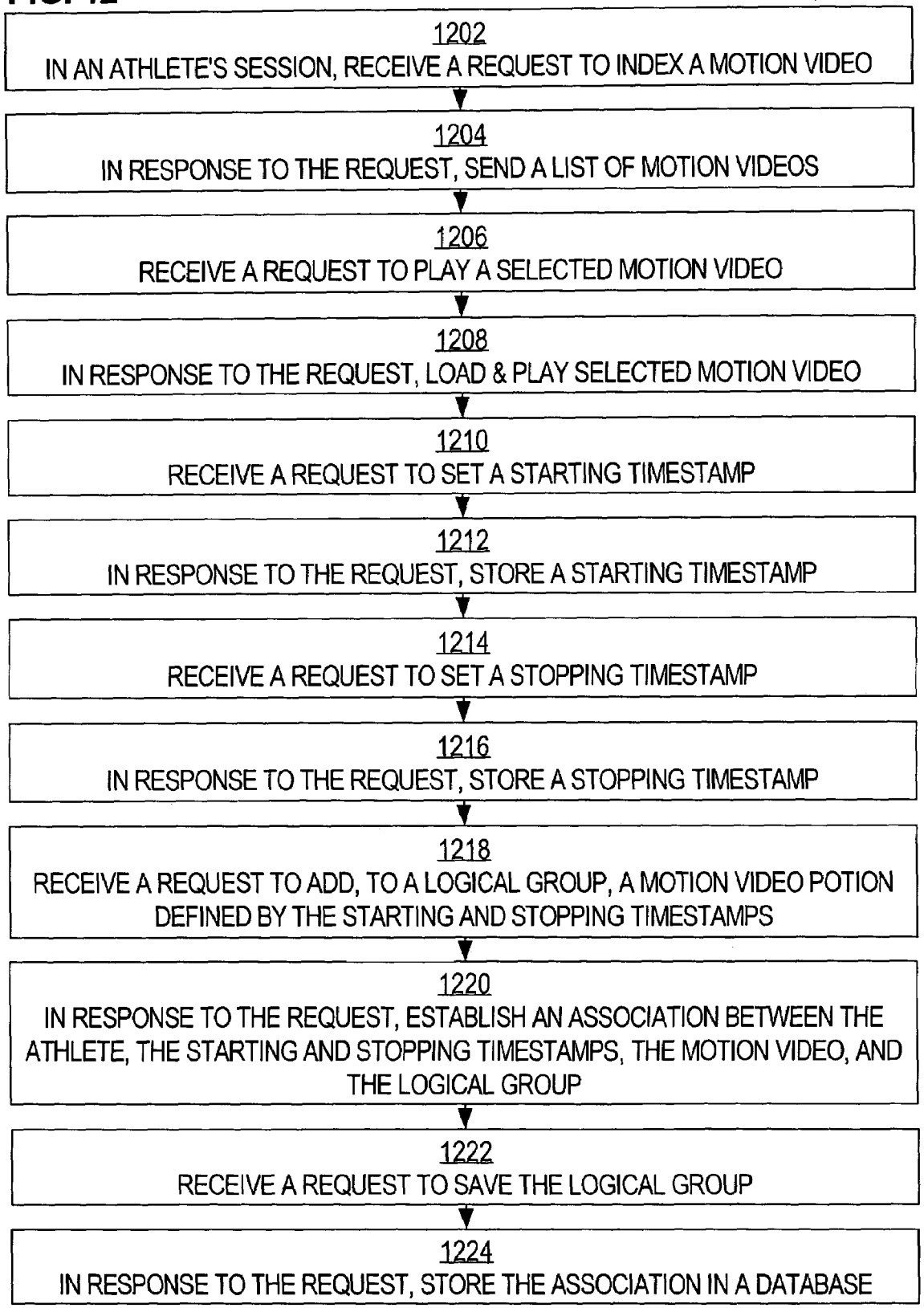

MOTION VIDEO INDEXING MECHANISM FOR ATHLETE RECRUITING ARCHITECTURE

RELATED APPLICATIONS

This application is related to U.S. patent application Ser. No. 10/753,908, entitled "ATHLETE RECRUITING ARCHITECTURE", filed on the same day herewith; and U.S. patent application Ser. No. 10/753,773, entitled "EVENT MANAGEMENT MECHANISM FOR ATHLETE RECRUITING ARCHITECTURE", filed on the same day herewith. The entire contents of these related applications are hereby incorporated by reference in their entirety for all purposes as if fully set forth herein.

FIELD OF THE INVENTION

The present invention relates generally to information management systems and, more specifically, to an architecture for recruiting athletes.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One of the main challenges faced by a coach of a college sports team lies in the recruiting of athletes to play on his team. Colleges typically recruit athletes from junior colleges and high schools. Each year, the pool of available athletes is large, and the time that a coach or his staff can devote to recruiting activities is limited. Some athletes are more talented than others, and a coach must try to recruit the most talented athletes that he can get in the short amount of time available to him. A good coach knows that other coaches will be competing for the most talented athletes as well.

As if the coach's job was not hard enough already, the National Collegiate Athletic Association (NCAA) imposes on the recruiting process rules that complicate the coach's task even further. Among these rules is a rule that allows an athlete to be recruited only after the athlete has attended school for a specified number of semesters. Also among these rules is a rule that generally prohibits coaches and their representatives from initiating communication with an athlete or the athlete's relatives either in person or by telephonic or written communications. Although it is in a coach's best interests to play by the NCAA rules, the rules make it difficult for a coach to establish a relationship with an athlete that the coach wants to recruit.

An athlete could initiate communication with a coach, assuming that the athlete even knew the coach's contact information. However, a student athlete's time is limited too. A typical student athlete's life overflows with competing academic, athletic, and social concerns. Moreover, many student athletes lack sufficient confidence to contact coaches who might or might not be interested. Many student athletes are discouraged by the fear of rejection.

It is hard enough for a coach to discover talented athletes in the first place. Because statistics alone rarely tell the whole story, a coach usually will want to see an athlete in action before deciding whether to attempt to recruit that athlete. Due to time limitations, long distances, and travel expenses, many coaches are unable to watch more than a few athletes perform in person each season.

An athlete or high school may videotape their game or athletic performance and send that videotape to a coach via the mail or other package delivery service. Most athletes and high school coaches do not have the time or financial resources to make and distribute multiple copies of a videotape. Furthermore, such copies usually lack the visual quality that a coach needs in order to fairly evaluate an athlete's performance. Therefore, it is common for only one videotape per athlete to be in circulation among coaches at a time. When a coach is finished watching a videotape, the coach sends the videotape, again via the mail or other package delivery service, back to the athlete or high school coach for redistribution to another coach. As a result, a particular athlete's videotape might only be distributed to a few schools before the recruiting season is over. The videotape distribution approach described above limits both an athlete's chances of being recruited and the number of athletes that a coach can evaluate.

Based on the foregoing, an approach for facilitating relationships between athletes and coaches that does not suffer from limitations in prior approaches is highly desirable.

SUMMARY OF THE INVENTION

An athlete recruiting system and architecture is disclosed. In one aspect, the athlete recruiting system provides a browser-oriented interface that allows a recruiting entity, such as an organization, to search for and find athletes that satisfy recruiting entity-specified criteria. In one aspect, the athlete recruiting system also allows motion videos to be associated with athletes. These motion videos may be uploaded or streamed to interested recruiting entities over communication links. In one aspect, the athlete recruiting system provides a video indexing mechanism that allows athletes and recruiting entities to generate and store indices to motion videos. In one aspect, the athlete recruiting system provides hit tracking mechanisms for notifying athletes about recruiting entities that have taken actions that indicate that the recruiting entities are interested in the athlete. As a result, athletes are encouraged to initiate contact with interested recruiting entities. In one aspect, the recruiting system allows an athlete to search for and find organizations that satisfy athlete-specified criteria. Thus, the athlete recruiting system promotes the formation of relationships between athletes and recruiting entities while adhering to rules imposed on the recruiting process.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that depicts an approach for generating stored position profiles in accordance with an embodiment of the invention.

FIG. 4 is a flow diagram that depicts an approach for selecting athletes based on a stored position profile in accordance with an embodiment of the invention.

FIG. 6 is a flow diagram that depicts an approach for notifying an athlete about organizations that have requested the athlete's information, in accordance with an embodiment of the invention.

FIG. 8 is a flow diagram that depicts an approach for notifying an athlete about organizations that have associated the athlete with those organizations' prospects lists, in accordance with an embodiment of the invention.

FIG. 9 is a flow diagram that depicts an approach for establishing an association between an athlete, an athletic event, and one or more motion videos, in accordance with an embodiment of the invention.

FIG. 10 is a block diagram that depicts a functional layout of a user interface that allows an athlete to index motion videos, in accordance with an embodiment of the invention.

FIG. 11 is a block diagram that depicts a functional layout of a user interface that allows a recruiter to index motion videos, in accordance with an embodiment of the invention.

FIG. 12 is a flow diagram that depicts an approach for indexing a motion video for an athlete, in accordance with an embodiment of the invention.

FIG. 14 is a flow diagram that depicts an approach for notifying an athlete about organizations that have added, to the organization's list of motion video portions, portions of motion videos that are associated with the athlete, in accordance with an embodiment of the invention.

DETAILED DESCRIPTION OF THE INVENTION

Figure 1:
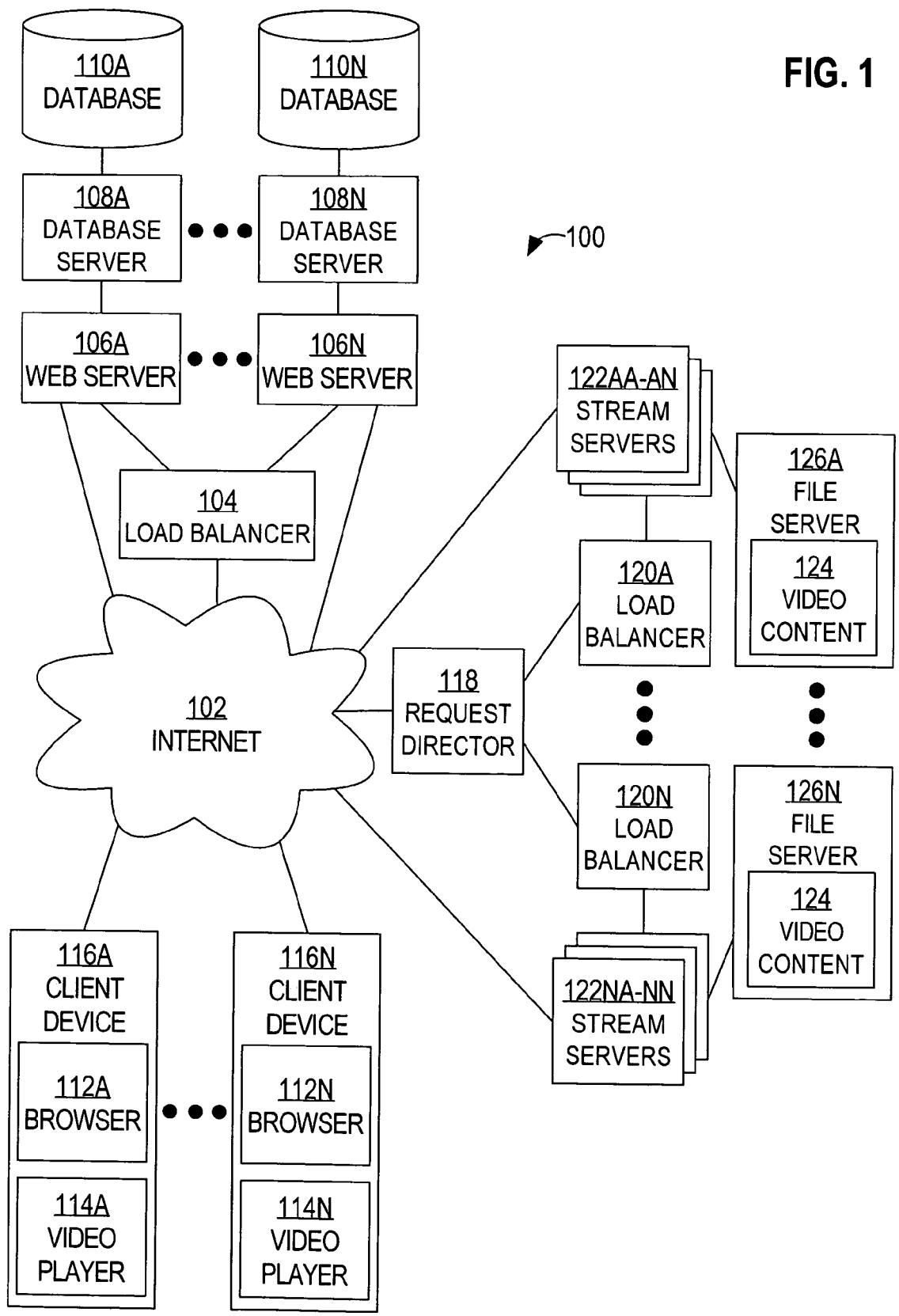
FIG. 1 is a block diagram that depicts a system for recruiting athletes in accordance with an embodiment of the invention.

A method and apparatus for recruiting athletes is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. SYSTEM ARCHITECTURE OVERVIEW
III. ATHLETE INFORMATION CONTENT
IV. ATHLETE-UPDATED, TIMESTAMPED ATHLETE INFORMATION
V. NON-ATHLETE-ENTERED, CERTIFIED ATHLETE INFORMATION
VI. SEARCHING FOR ATHLETES BASED ON SPECIFIED CRITERIA
VII. STORED POSITION PROFILES AND ONE-CLICK SEARCHING
VIII. NOTIFYING ATHLETES ABOUT ORGANIZATIONS FOR WHICH THE ATHLETES QUALIFY
IX. HIT TRACKING
X. NOTIFYING ATHLETES ABOUT ORGANIZATIONS THAT REQUEST VIDEO CLIPS ASSOCIATED WITH THE ATHLETES
XI. MAINTAINING A LIST OF PROSPECTIVE RECRUITS
XII. NOTIFYING ATHLETES ABOUT ORGANIZATIONS WHOSE PROSPECTS LISTS INCLUDE THE ATHLETES
XIII. PUBLIC/PRIVATE INFORMATION AND INVITED GUEST ACCOUNTS
XIV. ATHLETIC EVENT MANAGEMENT
XV. MOTION VIDEO INDEXING
XVI. NOTIFYING ATHLETES ABOUT ORGANIZATIONS THAT HAVE INDEXED MOTION VIDEOS ASSOCIATED WITH THE ATHLETES
XVII. MOTION VIDEO CONTENT CATEGORIZATION
XVIII. SINGLE SYSTEM FOR MULTIPLE SPORTS
XIX. IMPLEMENTATION MECHANISMS, ALTERNATIVES & EXTENSIONS

I. Overview

An athlete recruiting system and architecture is disclosed. In one aspect, the athlete recruiting system provides a browser-oriented interface that allows a recruiting entity, such as an organization, to search for and find athletes that satisfy recruiting entity-specified criteria. In one aspect, the athlete recruiting system allows motion videos to be associated with athletes. These motion videos may be uploaded or streamed to interested recruiting entities over communication links. In one aspect, the athlete recruiting system provides a video indexing mechanism that allows athletes and recruiting entities to generate and store indices to motion videos. In one aspect, the athlete recruiting system provides hit tracking mechanisms for notifying athletes about recruiting entities that have taken actions that indicate that the recruiting entities are interested in the athlete. As a result, athletes are encouraged to initiate contact with interested recruiting entities. Thus, the athlete recruiting system promotes the formation of relationships between athletes and recruiting entities while adhering to rules imposed on the recruiting process.

II. System Architecture Overview

FIG. 1 is a block diagram that depicts a system 100 for recruiting athletes in accordance with an embodiment of the invention. Athlete recruiting system 100 includes client devices 116A-N, each of which is coupled communicatively to the Internet 102. Athlete recruiting system 100 also includes a load balancer 104 that is coupled communicatively to the Internet 102; web servers 106A-N that are coupled communicatively to the Internet 102 and load balancer 104; database servers 108A-N that are coupled communicatively to web servers 106A-N, respectively; and databases 110A-N that are coupled communicatively to database servers 108A-N, respectively. For example, web server 106A is coupled communicatively to database server 108A; web server 106B is coupled communicatively to database server 108B; and so on. Similarly, database server 108A is coupled communicatively to database 110A; database server 108B is coupled communicatively to database 110B; and so on.

Athlete recruiting system 100 additionally includes a request director 118 that is coupled communicatively to the Internet 102; load balancers 120A-N that are coupled communicatively to request director 118; stream servers 122AA-NN that are coupled communicatively to load balancers 120A-N, respectively, and the Internet 102; and file servers 126A-N that are coupled communicatively to stream servers 122AA-NN, respectively. For example, stream servers 122AA-AN are coupled communicatively to load balancer 120A and file server 126A; stream servers 122BA-BN are coupled communicatively to load balancer 120B and file server 126B; and so on.

Client devices 116A-N are devices that are capable of interfacing with both a human being and the Internet 102. For example, client devices 116A-N may include general-purpose computers, diskless network workstations, and/or Internet appliances. Client devices 116A-N include browsers 112A-N, respectively, and video players 114A-N, respectively.

Browsers 112A-N are programs that are capable of sending Hypertext Transfer Protocol (HTTP) requests and receiving HTTP responses. For example, browsers 112A-N may include Microsoft Internet Explorer and/or Netscape Navigator. HTTP responses may include information that represents text, images, and/or motion video.

Video players 114A-N are programs that are capable of decoding information that represents motion video and displaying such motion video on a visual display device such as a monitor. For example, video players 114A-N may include RealNetworks RealOne Player and/or Microsoft Windows Media Player.

Under the direction of human users, browsers 112A-N send HTTP requests through the Internet 102 to load balancer 104. Load balancer 104 receives such HTTP requests and distributes them, according to a load-balancing scheme, among web servers 106A-N. In response to such requests, web servers 106A-N may send database queries to database servers 108A-N. For example, web servers 106A-N may send Structured Query Language (SQL) queries to database servers 108A-N. In response to such database queries, database servers 108A-N retrieve information from, remove information from, modify information in, and/or store information in databases 110A-N.

Each of databases 110A-N stores the same information. Database servers 108A-N are configured in a manner such that when information in any one of databases 110A-N is modified, the same information in all of the others of the databases is modified in the same way. Similarly, when information is added to or deleted from any one of databases 110A-N, the same information is added to or deleted from all of the others of the databases. Consequently, databases 110A-N exactly duplicate the information stored in each other of the databases.

In response to database queries that request information, database servers 108A-N retrieve information from databases 110A-N and send the information to the web servers from which the database queries originated. In response to receiving HTTP requests from browsers 112A-N, web servers 106A-N generate HTTP responses and send the HTTP responses through the Internet 102 to browsers 112A-N. In generating such HTTP responses, web servers 106A-N may incorporate into such HTTP responses the information received from databases servers 108A-N.

The information received from database servers 108A-N may include one or more Hypertext Markup Language (HTML) links. Each such link may indicate an identity of request director 118 and an identity of a motion video. For example, a Uniform Resource Locator (URL) may identify request director 118, and each motion video may be identified by a different path and filename.

Browsers 112A-N receive HTTP responses from web servers 106A-N through the Internet 102. Browsers 112A-N interpret the information contained in the HTTP responses and display the interpreted information, including any links contained in the HTTP responses. Human users may select such links to cause browsers 112A-N to send requests to request director 118. Each such request identifies the motion video that was identified in the link whose selection caused the request to be sent.

Request director 118 receives requests from browsers 112A-N and, by extension, client devices 116A-N. Based on factors such as the nature of the requests and the locations of the client devices, request director 118 selects, for each such request, one of load balancers 120A-N. For example, if request director 118 receives a request from client device 116A, then the request director may select the one of load balancers 120A-N that has the least communication delay relative to client device 116A. For each request, request director 118 sends the request to the one of load balancers 120A-N that the request director selected for that request.

Load balancers 120A-N receive requests from request director 118. Load balancers 120A-N distribute such requests, according to a load-balancing scheme, among stream servers 122AA-NN. Each of load balancers 120A-N is associated with a different subset of stream servers 122AA-NN, and each load balancer distributes requests among the stream servers within the subset that is associated with that load balancer. For example, load balancer 120A distributes requests among stream servers 122AA-AN; load balancer 120B distributes requests among stream servers 122BA-BN; and so on.

Each load balancer and associated subset of stream servers may be located in a different geographic area. For example, load balancer 120A and stream servers 122AA-AN might be located in New York, and load balancer 120B and stream servers 122BA-BN might be located in Los Angeles. Thus, for each request, request director 118 may direct the request to one of load balancers 120A-N that is in the same geographic area as the client device from which the request originated.

Stream servers 122AA-NN receive requests from load balancers 120A-N. In response to receiving such requests, stream servers 122AA-NN stream or upload motion videos to the client devices from which the requests originated. Such motion videos are collectively referred to as video content 124. Stream servers 122AA-NN obtain such motion videos from file servers 126A-N, upon which video content 124 is stored.

Each of file servers 126A-N is associated with a different subset of stream servers 122AA-NN, and each file server serves motion videos to the stream servers within the subset with which that file server is associated. For example, file server 126A serves motion videos to stream servers 122AA-AN; file server 126B serves motion videos to stream servers 122BA-BN; and so on.

Each of file servers 126A-N stores the same video content 124. File servers 126A-N are configured in a manner such that when video content 124 is modified on one of the file servers, the video content on all of the other file servers is modified in the same way. Similarly, when information is added to or deleted from video content 124 on one of the file servers, the same information is added to or deleted from the video content on all of the other file servers. Consequently, file servers 126A-N exactly duplicate video content 124.

Either through streaming or progressive download techniques, browsers 112A-N receive motion videos from stream servers 122AA-NN via the Internet 102. In response to receiving motion videos, browsers 112A-N invoke video players 114A-N, respectively. Video players 114A-N decode and display the motion videos as the motion videos are streamed, or after the motion videos have been downloaded completely.

Video content 124 may include relatively short motion videos that highlight an athlete's abilities. However, in addition to such short highlights, recruiters also typically want to see an athlete's performance throughout an entire sporting event. Therefore, video content 124 also may include motion videos that represent entire sporting events, such as entire football games or basketball games. Sporting events are usually long, and usually involve a lot of motion. As a result, motion videos containing complete sporting events are usually very large when converted to digital form.

Because request director 118 selects the subsets of stream servers based on the client devices from which the requests originated, even very large motion videos can be transmitted to the client devices with minimized delay. This aspect of the system permits larger motion videos to be transmitted without sacrificing the quality of those motion videos. For example, the system described above can be implemented to stream a 300-megabyte motion video that represents high-quality footage of an entire sporting event, at a speed that permits the motion video to be played relatively continuously as the motion video is being streamed, and without an unreasonable amount of pre-buffering.

Furthermore, because load balancers 120A-N distribute requests among multiple stream servers, no single stream server becomes overwhelmed by a large quantity of requests. This aspect of the system helps to prevent service outages when many client devices send requests at about the same time.

Several different versions of each motion video may be stored on file servers 126A-N in order to accommodate different client connection speeds. Each version may be of a different size and quality. A particular version of a motion video may be selected from among multiple versions of that motion video based on a user-specified or automatically detected client connection speed.

Browsers 112A-N communicate with web servers 106A-N in the context of sessions. When one of browsers 112A-N commences communication with one of web servers 106A-N, the web server requests a username and password. A human user supplies a username and password to the browser, which sends the username and password to the web server. If the web server recognizes the username and password, then a session is established between the web server and the browser. Each session is associated with the username supplied when that session was opened. A session remains open until the browser instructs the web server to close the session, or until the web server detects that a specified amount of time has passed since the web server sent information to or received information from the browser.

Each username is associated with an account type. By extension, each session is associated with the account type that is associated with that session's associated username. Account types may include, for example, an athlete account type, an organization account type, and a guest account type. The behavior of web servers 106A-N relative to a particular session may vary depending on whether the particular session is associated with an athlete account, an organization account, or a guest account.

III. Athlete Information Content

In one embodiment, for each athlete, the athlete recruiting system stores specified types of information in databases 110A-N. Generally, the type of information stored is the kind of information that a recruiter would be interested in knowing.

In one embodiment, an athlete's information—some or all of which may comprise the athlete's profile—includes athletic performance information, athlete academic information, and athlete biographical information. Athlete performance information may include athletic statistical information and athletic performance video data.

For example, an athlete's information may include the following types of information about the athlete: name, team position, home address, home telephone number, birth date, e-mail address, parent/guardian name, level (e.g., high school, junior college, etc.), school year (e.g., freshman, sophomore, junior, senior), years of NCAA eligibility, school name, school location (e.g., city and state), coach name, and coach telephone number.

Furthermore, an athlete's information may include the following types of athlete academic information: grade point average and standardized test scores (e.g., ACT, SAT, PSAT, etc.).

Additionally, an athlete's information may include the following types of athletic statistical information: height, weight, and sports-specific statistics (e.g., for basketball: points per game, rebounds per game, vertical jump height, field goal percentage, free throw percentage, 3-point field goal percentage, total assists, total steals, total blocks, etc.).

An athlete's information also may include the following types of athlete biographical information: athletic achievements and awards, desired college qualities, intended major, desired sport program qualities, desired coach qualities, favorite athlete, why that favorite athlete, hobbies and activities, people who influence decisions, etc.

The athlete himself may supply at least some of the information listed above to the athlete recruiting system. For example, when an athlete's account is initially created, the athlete recruiting system may present to the athlete an HTML form that lists questions and provides input fields for the answers to those questions. Some of the questions may be multiple choice type questions, while other questions may be fill-in-the-blank type questions. When the athlete submits the completed form, the athlete's answers are stored in databases 110A-N. The athlete recruiting system dynamically generates complete paragraphs based on the athlete's answers. These dynamically generated paragraphs may be presented to recruiters and other viewers as the athlete's biography and inside information.

In one embodiment, an athlete's information also includes a digitized photograph of the athlete. The photograph may visually indicate, by inch markings on a surface behind the athlete, how tall the athlete is. An athlete's information also may include a digitized image of the athlete's official academic transcript, and digitized images of official standardized test results. In one embodiment, the athlete's information also includes a list of athletic events with which the athlete is associated, such as games in which the athlete participated.

In one embodiment, the athlete recruiting system provides a mechanism through which an athlete can upload digital images to the athlete recruiting system. For example, an athlete may click an "upload photograph" link on a web page supplied by the athlete recruiting system. In response, a mechanism of the browser on the athlete's client device allows the athlete to browse for a file stored on the athlete's client device. In response to the athlete's selection of an image file, the browser transmits the selected image file to a web server. The web server stores the image file and inserts, into a database, an association between the image file and the athlete's account. The athlete recruiting system may provide a similar mechanism for allowing the athlete to upload scanned images of the athlete's official transcripts and official standardized test results by clicking on "upload transcript," "upload ACT," and "upload SAT" links, among others. The athlete recruiting system also may provide a similar mechanism for allowing the athlete to upload motion videos.

IV. Athlete-updated, Timestamped Athlete Information

In the real world, an athlete's information is not static. With each sporting event in which an athlete participates, the athlete's athletic statistics may change. With each semester, the athlete's grade point average may change. Over the course of just a few weeks, an athlete's height and weight can change significantly. When a recruiter is evaluating an athlete, the recruiter needs to know that the athlete's information is not outdated.

Therefore, in one embodiment, to keep athlete's information fresh, the athlete recruiting system provides an update mechanism that allows an athlete to update the athlete's own athlete information. To prevent users other than the athlete from updating the athlete's information, athlete information can only be updated within sessions that are associated with athlete accounts. Athletes' information cannot be updated within sessions associated with organization accounts and guest accounts. Although an athlete can update his own information, he cannot update other athletes' information.

Figure 2:
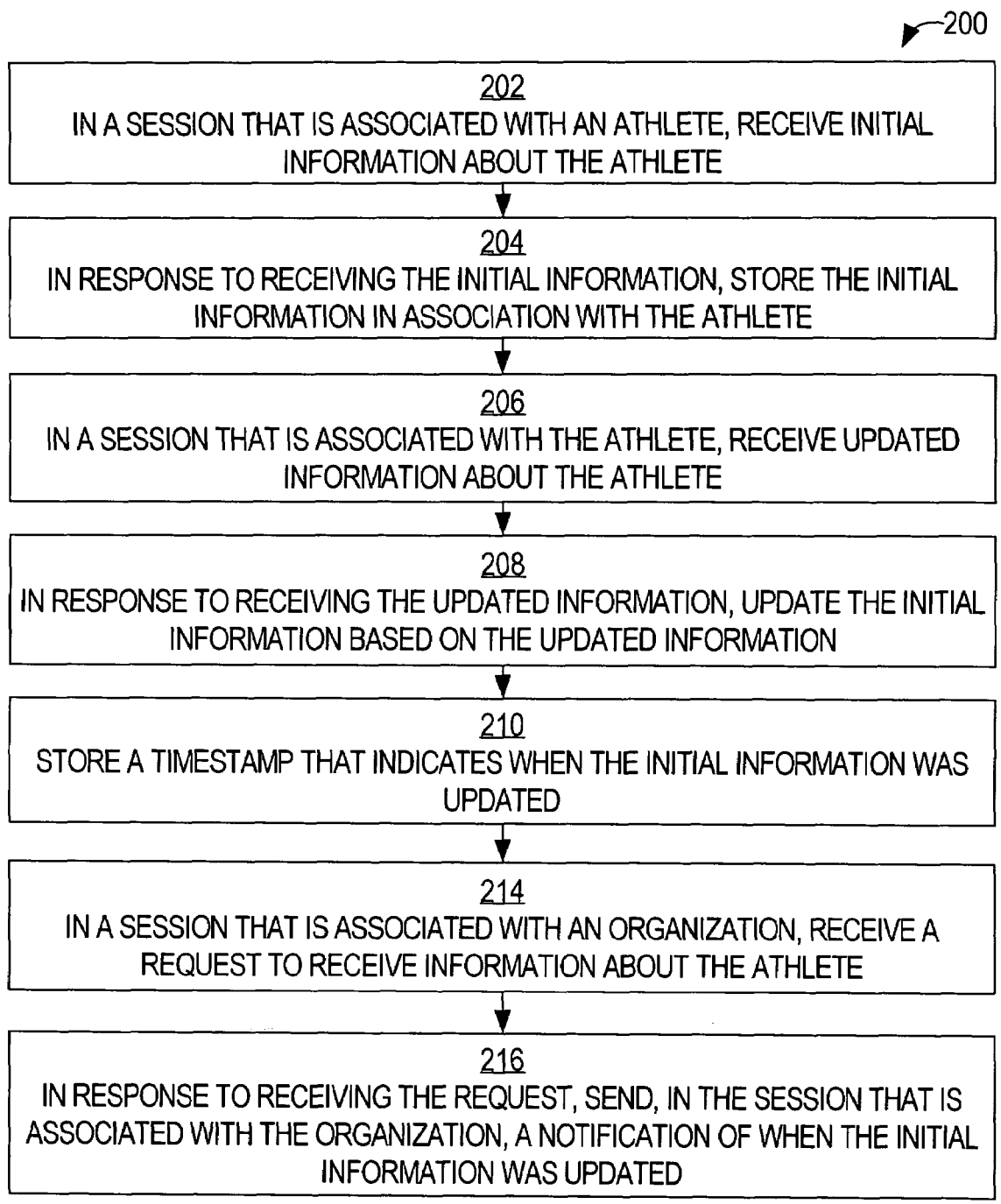
FIG. 2 is a flow diagram that depicts an approach for updating an athlete's information in accordance with an embodiment of the invention.

FIG. 2 is a flow diagram 200 that depicts an approach for updating an athlete's information in accordance with an embodiment of the invention. In block 202, initial information about an athlete is received in a session that is associated with the athlete. For example, using browser 112A, an athlete may submit his username and password to web server 106A in order to establish a session with the web server. The session is associated with the athlete's athlete account. The athlete may submit his initial athlete information to web server 106A in the session. As a result, web server 106A receives the athlete's initial athlete information.

In block 204, in response to the receipt of the initial athlete information, the initial athlete information is stored in association with the athlete. For example, in response to receiving the athlete's information, web server 106A may instruct database server 108A to store the athlete's information in database 110A. Responding to web server 106A, database server 108A may store the athlete's information in database table 110A. Database server 108A may store the athlete's information in a database table row that is associated with the athlete.

In block 206, updated information about the athlete is received in a session that is associated with the athlete. For example, using browser 112A, the athlete may update his information and submit his updated information to web server 106A in the session previously established with web server 106A. As a result, web server 106A receives the athlete's updated information.

In block 208, in response to the receipt of the updated information, the initial information is updated based on the updated information. For example, in response to receiving the athlete's updated information, web server 106A may instruct database server 108A to store the athlete's updated information in database 110A. Responding to web server 106A, database server 108A may store the athlete's updated information in database table 110A. Database server 108A may store the athlete's updated information in the database table row that stored the athlete's initial information.

In block 210, a timestamp is stored. The timestamp indicates when the initial information was updated. For example, when web server 106A instructs database server 108A to store the athlete's updated information, the web server also may instruct the database server to store a current timestamp. Responding to web server 106A, database server 108A may store the timestamp along with the athlete's updated information in database table 110A.

In block 214, a request to receive information about the athlete is received in a session that is associated with an organization. For example, using browser 112B, a recruiter may submit his username and password to web server 106B in order to establish a session with the web server. The session is associated with the recruiter's organization account. Using browser 112B, the recruiter may send, to web server 106B, a request to receive information about the athlete. As a result, web server 106B receives the request.

In block 216, in response to the receipt of the request, a notification of when the initial information was updated is sent in the session associated with the organization. For example, in response to receiving the request from web server 112B, web server 106B may instruct database server 108B to retrieve the athlete's information from database 110B. Responding to web server 106B, database server 108B may retrieve both the athlete's updated information and the timestamp from database 110B. Database server 108B may send both the athlete's updated information and the timestamp to web server 106B. In response, web server 106B may send both the athlete's updated information and the timestamp to browser 112N, in the session associated with the recruiter's organization account. Browser 112 may display the athlete's updated information and the timestamp. As a result, the recruiter sees the athlete's updated information and a notification of how recently the athlete's information was updated.

Thus, using the technique shown in flow diagram 200, the athlete recruiting system can enable athletes to update their own information. Furthermore, using this technique, the athlete recruiting system can tell recruiters how fresh a particular athlete's information is.

V. Non-athlete-entered, Certified Athlete Information

While in one embodiment the athlete recruiting system provides a mechanism that allows an athlete to update his own athlete information as described above, information entered by an athlete in some cases might be somewhat inaccurate. Often, professional athletic evaluators are able to evaluate an athlete more accurately than the athlete can evaluate himself.

Therefore, in one embodiment, the athlete recruiting system provides a mechanism whereby certified parties other than the athlete can input certified information about the athlete. Such certified information is associated with the athlete in databases 110A-N. Additionally, such certified information may be displayed with other information that the athlete entered himself. When the certified information is displayed, the certified information is indicated to the viewer as being certified information. The athlete recruiting system does not permit the athlete to input or update certified information.

At the time that the certified information is input or updated, a timestamp may be associated with the certified information in databases 110A-N. This timestamp may be displayed to a viewer of the certified information. Therefore, a recruiter viewing an athlete's certified information can see how recently the certified information was updated.

Motion videos also may be provided by certified parties, and added to video content 124. For example, a certified party may attend a sporting event such as a football game, record a motion video of the entire sporting event, and add the motion video to video content 124. The certified party may update databases 110A-N to indicate that athletes who participated in the sporting event are associated with the motion video. Thereafter, those viewing the information of an athlete who participated in the sporting event are presented with a link to the motion video. Each such athlete's information may indicate that the motion video is certified.

VI. Searching for Athletes Based on Specified Criteria

In one embodiment, the athlete recruiting system provides a mechanism for listing athletes that satisfy user-specified criteria. This mechanism involves an input mechanism through which a user can input specified criteria. For example, the input mechanism may be an HTML form that includes multiple input fields. Each input field corresponds to an item of information that the athlete recruiting system stores in association with an athlete. For example, one input field may correspond to a "height" information item, and another input field may correspond to a "weight" information item. One or more input fields may correspond to sport-specific information. For example, an input field may correspond to a "vertical jump height" information item.

Multiple input fields may correspond to a single information item. For example, both a "maximum height" input field and a "minimum height" input field may correspond to a single "height" information item.

The HTML form includes a mechanism, such as a graphical button, that, when activated, causes a browser to send the contents of the input fields to a web server. In response to receiving the contents of the input fields, the web server generates and sends a database query to a database server. The database query instructs the database server to select, from a database, the identities of all of the athletes that satisfy the criteria specified in the input fields. The database query may also instruct the database server to select additional information about the athletes that satisfy the criteria.

In response to receiving the database query, the database server selects, from a database, the identities of all of the athletes that satisfy the criteria specified in the input fields. For example, if the criteria specify only a minimum height of 6'2", then the database server selects all athletes associated with a height of at least 6'2". Depending on the database query, the database server also may select, from the database, additional information about the athletes that satisfy the criteria.

The database server returns the selected information to the web server, which dynamically generates a web page that contains the selected information. The web server sends the dynamically generated web page to the browser from which the HTML form was submitted. The browser receives the web page and presents the web page to the user that specified the criteria.

In one embodiment, the selected information includes the names of the athletes whose athlete information satisfies the specified criteria. Each such name may be presented in a separate link to a profile page for the corresponding athlete. The links that indicate names of athletes whose profiles a recruiter has already requested may be visibly distinguished from the links that indicate names of athletes whose profiles the recruiter has not already requested. For example, a browser may display, in a different color, links to pages that have already been visited. Alternatively, each organization's account may be associated, in databases 110A-N, with the identities of athletes whose profile pages already have been requested in one or more of that organization's sessions. When generating the web page that lists the selected athlete names, a web server may use these associations to determine the manner in which the names of various athletes should be displayed, to distinguish athletes whose profiles have been requested in one or more of a particular organization's sessions from the names of athletes whose profiles have not been requested in any of the particular organization's sessions.

According to one embodiment, the web server does not rank the selected information when generating the web page. This allows a recruiter to make his own judgments about the desirability of each athlete without being influenced by factors that might not be relevant to the recruiter.

In one embodiment, the athlete recruiting system provides a mechanism that allows the selected information to be saved and later restored. For example, the web page indicating the results may contain a "save" control that, when activated, causes the information contained in the web page to be associated with a organization's session and stored in databases 110A-N. Alternatively, the activation of the "save" control may cause the information contained in the web page to be stored in a file on the client device on which the browser displaying the web page resides.

In one embodiment, the athlete recruiting system also provides a mechanism that allows athletes to search for organizations based on athlete-submitted criteria. Organizations may submit organization information to the athlete recruiting system in the same manner that athletes submit athlete information to the athlete recruiting system. The athlete recruiting system may present an athlete with a list of organizations that are associated with organization information that satisfies the athlete's criteria. Such criteria may include, for example, region, division, student body size, win-loss statistics, etc.

VII. Stored Position Profiles and One-click Searching

As described above, in one embodiment, the athlete recruiting system provides a mechanism for listing athletes that satisfy a user-specified set of criteria. A recruiter can use this mechanism to select, from the pool of athletes having information in databases 110A-N, all athletes whose information satisfies the recruiter's specified criteria.

However, re-entering all selection criteria every time that a selective search is desired can be time-consuming. Furthermore, a recruiter might want to specify different selection criteria for different team positions. Referring to basketball, for example, a recruiter might be interested in forwards that are taller than 6'4", but the recruiter might be interested in centers that are taller than 6'7". Additionally, a recruiter might be interested only in athletes that have at least a 2.5 grade point average. Requiring a recruiter to repetitively enter all selection criteria for each different position can frustrate the recruiter. Many recruiters do not want to enter selection criteria at all; some recruiters would rather have a technical assistant enter the criteria so that the recruiter simply can obtain search results.

Therefore, in one embodiment, the athlete recruiting system provides a mechanism for storing team position-specific selection criteria. Each separate organization account may be associated with a different set of team-position specific criteria. In a particular set of team position-specific criteria, a separate set of criteria may be associated with each different team position. Referring to basketball, for example, one set of criteria may be associated with a forward position, and another set of criteria may be associated with a center position.

Once the team position-specific criteria has been specified, the criteria may be associated with the organization's account and stored in databases 110A-N. Such criteria are referred to as the particular organization account's "stored position profile." Thereafter, in any session associated with the particular organization account, the particular organization account's stored position profile may be retrieved from a database and updated. This allows a recruiter to modify part of a stored position profile without requiring the recruiter to re-enter all of the selection criteria.

Furthermore, in one embodiment, once a stored position profile has been associated with a particular organization's account, the athlete recruiting system provides a mechanism, within sessions associated with the particular organization's account, whereby athletes may be selected based on the stored position profile in response to the activation of a "qualifiers" link. Thus, once a position profile has been stored in association with a recruiter's organization's account, the recruiter can see athletes that satisfy the organization's stored position profile simply by clicking once on the "qualifiers" link.

In databases 110A-N, each athlete is associated with a team position, and athletes are selected based on the selection criteria for the team position with which those athletes are associated. For example, athletes associated with the forward position are selected based on selection criteria specified for the forward position, and athletes associated with the center position are selected based on selection criteria specified for the center position.

Athletes selected based on the stored position profile may be listed by team position. For example, by clicking the "qualifiers" link, a basketball recruiter might see five columns of athlete names: a column for centers, a column for point guards, a column for shooting guards, a column for power forwards, and a column for forwards. Each column lists the names of selected athletes who are associated with that column's team position. Each such name may be presented as a link that, when activated, causes at least a portion of the associated athlete's information to be displayed.

FIG. 3 is a flow diagram 300 that depicts an approach for generating stored position profiles in accordance with an embodiment of the invention. In block 302, indications of two or more different sets of requirements are sent in a session that is associated with an organization ("the organization's session"). At least one set of requirements is associated with a team's first position, and at least another set of requirements is associated with a team's second position.

For example, in a first organization's session, web server 106C may send, to browser 112C, an indication of the first organization's stored requirements for a forward position and a center position. The requirements initially may be unspecified. Additionally, in a second organization's session, web server 106D may send, to browser 112D, an indication of the second organization's stored requirements for the forward position and the center position. The first and second organization's requirements for the same team position may differ.

In block 304, a form is sent in the organization's session. The form includes a separate input field for each requirement in the first set of requirements and each requirement in the second set of requirements. For example, in the first organization's session, web server 106C may send, to browser 112C, a form that includes multiple input fields for the forward position, and multiple input fields for the center position. Each input field may correspond to a different information item, such as height or weight. Additionally, in the second organization's session, web server 106D may send, to browser 112D, a form that includes multiple input fields for the forward position, and multiple input fields for the center position.

The form may be included in the same web page as the indication of the organization's currently stored requirements. The form's input fields initially may indicate the organization's currently stored requirements. Using a browser, a recruiter can enter or update values in the form's input fields. When the recruiter submits the form, the values are sent to a web server. The values represent updated sets of requirements.

In block 306, both a first set of requirements and a second set of requirements are received in the organization's session. For example, in the first organization's session, web server 106C may receive, from browser 112C, the first organization's updated requirements for the forward position and the center position. Additionally, in the second organization's session, web server 106D may receive, from browser 112D, the second organization's updated requirements for the forward position and the center position.

In block 308, based on the first set of requirements, a first set of values that are associated with both the organization and the team's first position are updated. For example, web server 106C may instruct database server 108C to update the first organization's stored requirements for the forward position based on the first organization's updated requirements for the forward position. Additionally, web server 106D may instruct database server 108D to update the second organization's stored requirements for the forward position based on the second organization's updated requirements for the forward position.

In block 310, based on the second set of requirements, a second set of values that are associated with both the organization and the team's second position are updated. For example, web server 106C may instruct database server 108C to update the first organization's stored requirements for the center position based on the first organization's updated requirements for the center position. Additionally, web server 106D may instruct database server 108D to update the second organization's stored requirements for the center position based on the second organization's updated requirements for the center position.

Thus, different organizations may be associated with different stored position profiles. Each stored position profile may specify different selection criteria for different team positions. Selection criteria for a particular organization and a particular team position may be stored in a database table row that is associated with the particular organization and the particular team position.

FIG. 4 is a flow diagram 400 that depicts an approach for selecting athletes based on a stored position profile in accordance with an embodiment of the invention. In block 402, for each athlete in a set of athletes, a separate set of values associated with that athlete is stored. Each separate set of values comprises a different athlete's information. Such information may be stored, for example, according to the approach described above with reference to flow diagram 200.

In block 404, a first set of requirements is stored in a database. The first set of requirements is associated with both an organization and a team's first position. Taking basketball as an example, the team's first position might be a forward position. The first set of requirements may be stored, for example, according to the approach described above with reference to flow diagram 300.

In block 406, a second set of requirements is stored in a database. The second set of requirements is associated with both the organization and a team's second position. Taking basketball as an example, the team's second position might be a center position. Like the first set of requirements, the second set of requirements may be stored, for example, according to the approach described above with reference to flow diagram 300.

In block 408, a request to list (e.g., search for) athletes is received in the organization's session. For example, web server 106C may receive, from browser 112C, a request to list athletes that match a first organization's stored position profile. A recruiter might cause browser 112C to send such a request to web server 106C by activating a "qualifiers" link displayed by browser 112C. In doing so, the recruiter would not need to re-enter the first organization's stored position profile.

Additionally, web server 106D may receive, from browser 112D, a request to list athletes that match a second organization's stored position profile.

In block 410, in response to the receipt of the request, the first set of requirements is read from the database. For example, in response to receiving the request from browser 112C, web server 106C may instruct database server 108C to read, from database 110C, the first organization's requirements for the forward position, as indicated in the first organization's stored position profile. Responding to web server 106C, database server 108C may read the requirements from database 110C and return the requirements to the web server. One such requirement may be that an athlete's associated team position is the forward position.

Additionally, in response to receiving the request from browser 112D, web server 106D may instruct database server 108D to read, from database 110D, the second organization's requirements for the forward position, as indicated in the second organization's stored position profile. Responding to web server 106D, database server 108D may read the requirements from database 110D and return the requirements to the web server.

In block 412, a first subset of athletes that satisfy the first set of requirements is selected from the set of athletes. For example, web server 106C may instruct database server 108C to select, from database 110C, athletes who are associated with athlete information that satisfies the first organization's requirements for the forward position. Responding to web server 106C, database server 108C may select such athletes from database 110C and return the results to web server 106C. For example, the results may be a list of names of "forwards" that are associated with athlete information that satisfies the first organization's requirements for the forward position.

Additionally, web server 106D may instruct database server 108D to select, from database 110D, athletes who are associated with athlete information that satisfies the second organization's requirements for the forward position. Responding to web server 106D, database server 108D may select such athletes from database 110D and return the results to web server 106D. For example, the results may be a list of names of "forwards" that are associated with athlete information that satisfies the second organization's requirements for the forward position. Because the second organization's requirements for the forward position may differ from the first organization's requirements for the forward position, the athletes selected by database server 108C and the athletes selected by database server 108D may differ.

In block 414, also in response to the receipt of the request of block 408, the second set of requirements is read from the database. For example, in response to receiving the request from browser 112C, web server 106C may instruct database server 108C to read, from database 110C, the first organization's requirements for the center position, as indicated in the first organization's stored position profile. Responding to web server 106C, database server 108C may read the requirements from database 110C and return the requirements to the web server. One such requirement may be that an athlete's associated team position is the center position.

Additionally, in response to receiving the request from browser 112D, web server 106D may instruct database server 108D to read, from database 110D, the second organization's requirements for the center position, as indicated in the second organization's stored position profile. Responding to web server 106D, database server 108D may read the requirements from database 110D and return the requirements to the web server.

In block 416, a second subset of athletes that satisfy the second set of requirements is selected from the set of athletes. For example, web server 106C may instruct database server 108C to select, from database 110C, athletes who are associated with athlete information that satisfies the first organization's requirements for the center position. Responding to web server 106C, database server 108C may select such athletes from database 110C and return the results to web server 106C. For example, the results may be a list of names of "centers" that are associated with athlete information that satisfies the first organization's requirements for the center position.

Additionally, web server 106D may instruct database server 108D to select, from database 110D, athletes who are associated with athlete information that satisfies the second organization's requirements for the center position. Responding to web server 106D, database server 108D may select such athletes from database 110D and return the results to web server 106D. For example, the results may be a list of names of "centers" that are associated with athlete information that satisfies the second organization's requirements for the center position. Because the second organization's requirements for the center position may differ from the first organization's requirements for the center position, the athletes selected by database server 108C and the athletes selected by database server 108D may differ.

In block 418, in the organization's session, a notification is sent over a communication network. The notification indicates the composition of the first and second subsets of athletes. For example, web server 106C may send, over the Internet 102 to browser 112C, a list of names of athletes that satisfy the first organization's requirements for the forward position, and a list of names of athletes that satisfy the first organization's requirements for the center position. Additionally, web server 106D may send, over the Internet 102 to browser 112D, a list of names of athletes that satisfy the second organization's requirements for the forward position, and a list of names of athletes that satisfy the second organization's requirements for the center position. Each athlete's name may be a link that, when activated, causes a browser to request and display at least a portion of that athlete's information. Each such link also may include information other than an athlete's name, such as the athlete's year in school (e.g., freshman, sophomore, junior, or senior).

Thus, by activating a "qualifiers" link, a recruiter can obtain, for each team position, a list of athletes that satisfy requirements for that team position, as indicated in the recruiter's organization's stored position profile. Although the examples above refer for sake of illustration to two organizations, two team positions, two sets of requirements for each organization, and two subsets of athletes for each organization, embodiments of the invention are not limited to any number of organizations, team positions, sets of requirements, or subsets of athletes.

VIII. Notifying Athletes about Organizations for which the Athletes Qualify

Athletes often do not have access to much information about what organizations are looking for in potential recruits.

Because athletes often are uncertain about whether an organization would be interested, athletes sometimes are discouraged from initiating contact with the organization. With so many organizations to choose from, an athlete might not even know where to begin looking. Without direction, athletes initially may initiate contact with organizations that are not interested. Rejection can discourage athletes from contacting other organizations that might be interested.

Because NCAA rules limit the contact that a recruiter can initiate with an athlete, a recruiter might not ever find out about an athlete unless that athlete contacts the recruiter first. The lack of information available to athletes works against both recruiters and athletes.

Therefore, in one embodiment, the athlete recruiting system provides a mechanism for notifying an athlete about organizations for which the athlete is qualified. According to approaches described above, the athlete recruiting system can store both athlete information and stored position profiles for multiple organizations. By comparing an athlete's information with different organization's stored position profiles, the athlete recruiting system can determine which organizations are associated with stored position profiles that the athlete satisfies. The athlete recruiting system can inform the athlete about such organizations, thereby encouraging the athlete to initiate contact with those organizations.

Figure 5:
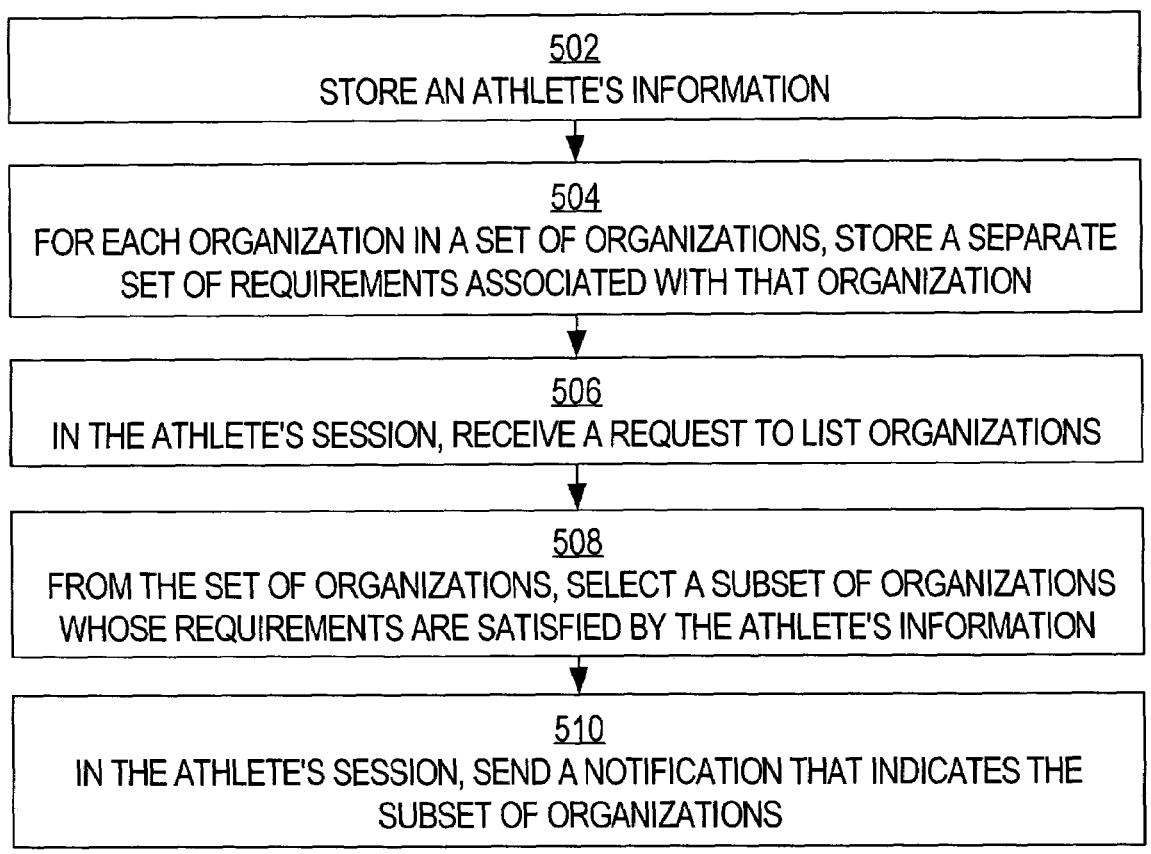
FIG. 5 is a flow diagram that depicts an approach for notifying an athlete about organizations for which the athlete qualifies, in accordance with an embodiment of the invention.

FIG. 5 is a flow diagram 500 that depicts an approach for notifying athletes about organizations for which those athletes qualify, in accordance with an embodiment of the invention. In block 502, an athlete's information is stored. Such information may be stored, for example, according to the approach described above with reference to flow diagram 200.

In block 504, for each organization in a set of organizations, a separate set of requirements associated with that organization is stored. Each set of requirements may include separate requirements for different team positions. Such information may be stored, for example, according to the approach described above with reference to flow diagram 300. An organization's set of requirements may be represented in the organization's stored position profile.

In block 506, a request to list (e.g., search for) organizations is received in the athlete's session. For example, web server 106A may receive, from browser 112A, a request to list organizations whose requirements are satisfied by a first athlete's information. An athlete might cause browser 112A to send such a request to web server 106A by activating a link displayed by browser 112A.

Additionally, web server 106B may receive, from browser 112B, a request to list organizations whose requirements are satisfied by a second athlete's information.

In block 508, in response to the receipt of the request, a subset of organizations whose requirements are satisfied by the athlete's information is selected from the set of organizations. For example, in response to receiving a request from browser 112A, web server 106A may instruct database server 108A to select, from database 110A, organizations that are associated with stored position profiles that are satisfied by the first athlete's information. Responding to web server 106A, database server 108A may select such organizations from database 110A and return the results to web server 106A. For example, the results may be a list of names of organizations.

The selection may be implemented in such a way that the only organizations excluded from the subset are organizations whose requirements are not satisfied by the athlete's information. This may cause more organizations to be selected.

Additionally, in response to receiving a request from browser 112B, web server 106B may instruct database server 108B to select, from database 110B, organizations that are associated with stored position profiles that are satisfied by the second athlete's information. Responding to web server 106B, database server 108B may select such organizations from database 110B and return the results to web server 106B. Because the second athlete's information may differ from the first athlete's information, the organizations selected by database server 108A and the organizations selected by database server 108B may differ.

In block 510, in the athlete's session, a notification is sent over a communication network. The notification indicates the composition of the subset of organizations. For example, web server 106A may send, over the Internet 102 to browser 112A, a list of names of organizations whose stored position profiles are satisfied by the first athlete's information. Additionally, web server 106B may send, over the Internet 102 to browser 112B, a list of names of organizations whose stored position profiles are satisfied by the second athlete's information.

Each organization's name may be a link that, when activated, causes a browser to request and display that organization's information. Each such link also may include information other than the organization's name, such as the organization's location (e.g., city and state). An organization's information may indicate information about one or more of the organization's recruiters, and contact information (e.g., telephone number and e-mail address) for one or more of the organization's recruiters. In one embodiment, the specific requirements associated with each organization are deliberately obscured from athletes.

Thus, an athlete can be notified about organizations for which that athlete is qualified. This encourages the athlete to initiate contact with those organizations, thereby furthering the recruiting process for both coaches and athletes. Under NCAA rules, once an athlete has initiated contact with a coach, the coach is then free to communicate with the athlete. Although the examples above refer for sake of illustration to two athletes and two subsets of organizations, embodiments of the invention are not limited to any number of athletes or subsets of organizations.

In an alternative embodiment, instead of selecting a subset of organizations, the athlete recruiting system selects a subset of conferences that are associated with average requirements that an athlete satisfies. To determine the average requirements for a conference, the athlete recruiting system averages the requirements of all of the organizations in the conference. A separate average is determined for each separate requirement. For example, the athlete recruiting system may determine the average height requirement for organizations in a particular conference, and the average weight requirement for organizations in the particular conference. In such an embodiment, an athlete may be presented with a list of conferences rather than a list of organizations.

IX. Hit Tracking

According to one embodiment, the athlete recruiting system includes a "hit tracking" mechanism that notifies an athlete about organizations that have requested information about the athlete. As described above, a link to an athlete's information may be presented in an organization's session under various circumstances. For example, a link to an athlete's information may be presented in a list of search results. The activation of such a link typically causes at least a portion of the athlete's information—also called the athlete's "profile"—to be requested, retrieved, and displayed. When a specific and individual athlete's information, or a portion thereof, is request in an organization's session, it is a strong indication that the organization is interested in the athlete.

When the athlete recruiting system detects that a link to the athlete's information was activated in an organization's session, the athlete recruiting system tracks that activation. An activation of a link to the athlete's information generates a "hit" for the athlete. For example, if a recruiter selects a link that indicates an athlete's name, then the athlete recruiting system may store data that indicates that the recruiter's organization's account generated a hit for that athlete. Subsequently, the athlete recruiting system may notify the athlete with the identity of the organization that generated a hit for the athlete. This helps the athlete to know which organizations are interested in the athlete, and encourages the athlete to initiate contact with interested organizations.

In one embodiment, the athlete recruiting system notifies an athlete about the identities of interested organizations, but without disclosing the names of any individuals who participated in generating a hit. An athlete may discover the contact information of a recruiter associated with an organization by activating a link that identifies the organization.

In one embodiment, the athlete recruiting system's hit tracking mechanism also notifies an athlete about how many times a particular organization's account has generated hits for the athlete. For example, if an athlete's name is selected five times in sessions associated with a particular organization, then the athlete recruiting system may notify the athlete that the particular organization generated five hits for the athlete. This helps an athlete determine the magnitude of an organization's interest.

FIG. 6 is a flow diagram 600 that depicts an approach for notifying an athlete about organizations that have requested the athlete's information, in accordance with an embodiment of the invention. In block 602, an athlete's information is stored. Such information may be stored, for example, according to the approach described above with reference to flow diagram 200. For example, given a first athlete and a second athlete, each of whom differ from each other, both the first athlete's information and the second athlete's information may be stored in databases 110A-N.

In block 604, a request receive at least a portion of the athlete's information is received in an organization's session. For example, web server 106C may receive, from browser 112C, a request to retrieve and display the first athlete's profile. A recruiter might cause browser 112C to send such a request to web server 106C by activating a link displayed by browser 112C. The link may indicate the first athlete's name.

Additionally, web server 106D may receive, from browser 112D, a request to retrieve and display the first athlete's profile. The session associated with browser 112C may be associated with a first organization, while the session associated with browser 112D may be associated with a second organization that differs from the first organization.

Subsequently, web server 106C may receive, from browser 112C, a request to retrieve and display the second athlete's profile.

In block 606, in response to the receipt of the request, a value that is associated with both the organization and the athlete is updated. For example, in response to receiving, in the first organization's session, the request from browser 112C for the first athlete's profile, web server 106C may instruct database server 108C to increment, in database 110C, a hit count associated with the first organization and the first athlete. Responding to web server 106C, database server 108C may update a record associated with both the first organization and the first athlete in database 110C. The record indicates how many times the first organization has generated hits for the first athlete. The others of databases 110A-N are similarly updated.

Additionally, in response to receiving, in the second organization's session, the request from browser 112D for the first athlete's profile, web server 106D may instruct database server 108D to increment, in database 110D, a hit count associated with the second organization and the first athlete. Responding to web server 106D, database server 108D may update a record associated with both the second organization and the first athlete in database 110D. The record indicates how many times the second organization has generated hits for the first athlete. The others of databases 110A-N are similarly updated.

Subsequently, in response to receiving, in the first organization's session, the request from browser 112C for the second athlete's profile, web server 106C may instruct database server 108C to increment, in database 110C, a hit count associated with the first organization and the second athlete. Responding to web server 106D, database server 108D may update a record associated with both the first organization and the second athlete in database 110D. The record indicates how many times the first organization has generated hits for the second athlete. The others of databases 110A-N are similarly updated.

The three hit counts described in the examples above are separate from each other. One hit count is associated with the first organization and the first athlete, one hit count is associated with the second organization and the first athlete, and one hit count is associated with the first organization and the second athlete. Updating a particular hit count does not affect any other hit count.

While in one embodiment a hit count is stored for each organization and athlete combination, in an alternative embodiment, a Boolean value is stored instead. The Boolean value indicates whether a particular organization has ever generated a hit for a particular athlete, but not the number of times that the particular organization has generated a hit for the particular athlete.

In block 608, in the athlete's session, a notification is sent over a communication network. The notification indicates that the organization requested at least a portion of the athlete's information. For example, such a notification may be sent to a web browser in response to an athlete activating a "hit tracker" link in the web browser. Thus, to abide by NCAA rules, the notification may be sent in response to an athlete's inquiry rather than a recruiter's action. The notification is based on the value updated in block 606. In one embodiment, the notification also indicates the number of times that the organization has requested at least a portion of the athlete's information. The information indicated in the notification may be obtained from databases 110A-N.

For example, in the first athlete's session, web server 106A may send, over the Internet 102 to browser 112A, a list of names of organizations that have generated hits for the first athlete. Additionally, in the second athlete's session, web server 106B may send, over the Internet 102 to browser 112B, a list of names of organizations that have generated hits for the first athlete. In addition to the names of organizations that have generated hits for an athlete, a web server may send numbers that indicate how many times that each listed organization has generated hits for the athlete. Other information about listed organizations, such as the locations of the listed organizations (e.g., city and state), also may be sent.

Through the hit tracking approach described above, athletes may be notified about organizations that are interested in the athletes. As a result, athletes are encouraged to initiate contact with interested organizations. To encourage an athlete to initiate contact with a recruiter, the recruiter and/or his staff may generate numerous hits for the athlete without ever actually initiating contact with the athlete. Although the examples above refer for sake of illustration to two athletes and two organizations, embodiments of the invention are not limited to any number of athletes or organizations.

While in one embodiment the athlete recruiting system tracks activations of links associated with an athlete, in an alternative embodiment, the athlete recruiting system also or instead tracks inclusions of an athlete's identity within search results. Thus, in such an alternative embodiment, the athlete recruiting system may notify an athlete about organizations that received the athlete's identity in search results in those organizations' sessions, regardless of whether a link associated with the athlete was ever activated in those organizations' sessions.

While in one embodiment the notification sent to an athlete comprises a web page requested by the athlete, in an alternative embodiment, the notification also or instead comprises an e-mail sent to the athlete's e-mail address in response to the activation of a link associated with the athlete.

X. Notifying Athletes about Organizations that Request Video Clips Associated with the Athletes In one embodiment, the athlete recruiting system includes a mechanism that allows associations to be established between one or more athletes and one or more motion videos. For example, video content 124 may include a motion video of a basketball game. The identities of the athletes who participated in the basketball game may be associated with the motion video. A particular athlete may be associated with multiple motion videos, and a particular motion video may be associated with multiple athletes. Such associations may be established and stored in databases 110A-N.

A browser may send a request for a particular motion video to a web server. The request may be sent in a particular organization's session. According to one embodiment, in response to detecting a request for a particular motion video, the web server instructs a database server to retrieve the identities of the athletes that are associated with the particular motion video. Responding to the web server, the database server retrieves the athletes' identities from a database and returns the athletes' identities to the web server. In response to receiving the athlete's identities, the web server causes the database server to store, for each athlete whose identity was received, video request hit tracking information that indicates that the particular organization requested a motion video that is associated with that athlete.

According to one embodiment, the athlete recruiting system sends, to an athlete, a notification that indicates, based on the video request hit tracking information, the identities of organizations that have requested motion videos that are associated with that athlete. The notification may identify the motion videos that were requested, and/or a number of times that a particular organization requested a motion video that is associated with the athlete. For example, the notification may be sent over the Internet to a browser in response to the athlete activating a link in the browser. Alternatively or additionally, the notification may be included in an e-mail sent to the athlete's e-mail address in response to an organization requesting a motion video that is associated with the athlete.

In addition to allowing the establishment of associations between motion videos and athletes, in one embodiment, the athlete recruiting system also allows associations to be established between organizations and motion videos. For example, an association may be established between a motion video and the identities of the teams that participated in an athletic event represented by the motion video.

XI. Maintaining a List of Prospective Recruits

If a recruiter is especially interested in recruiting an athlete, he may want to make a note of that athlete for future reference. Searching for the same athletes over and over can become tedious. Therefore, in one embodiment, the athlete recruiting system provides a mechanism whereby an organization can add and remove athletes from that organization's "prospects" list. An organization's prospects list functions as a sort of "shopping cart" into which athletes can be inserted and from which athletes can be removed. With the activation of a single link, a recruiter can see the athletes that are currently associated with that recruiter's organization's prospects list. Each separate organization may be associated with a separate prospects list.

Figure 7:
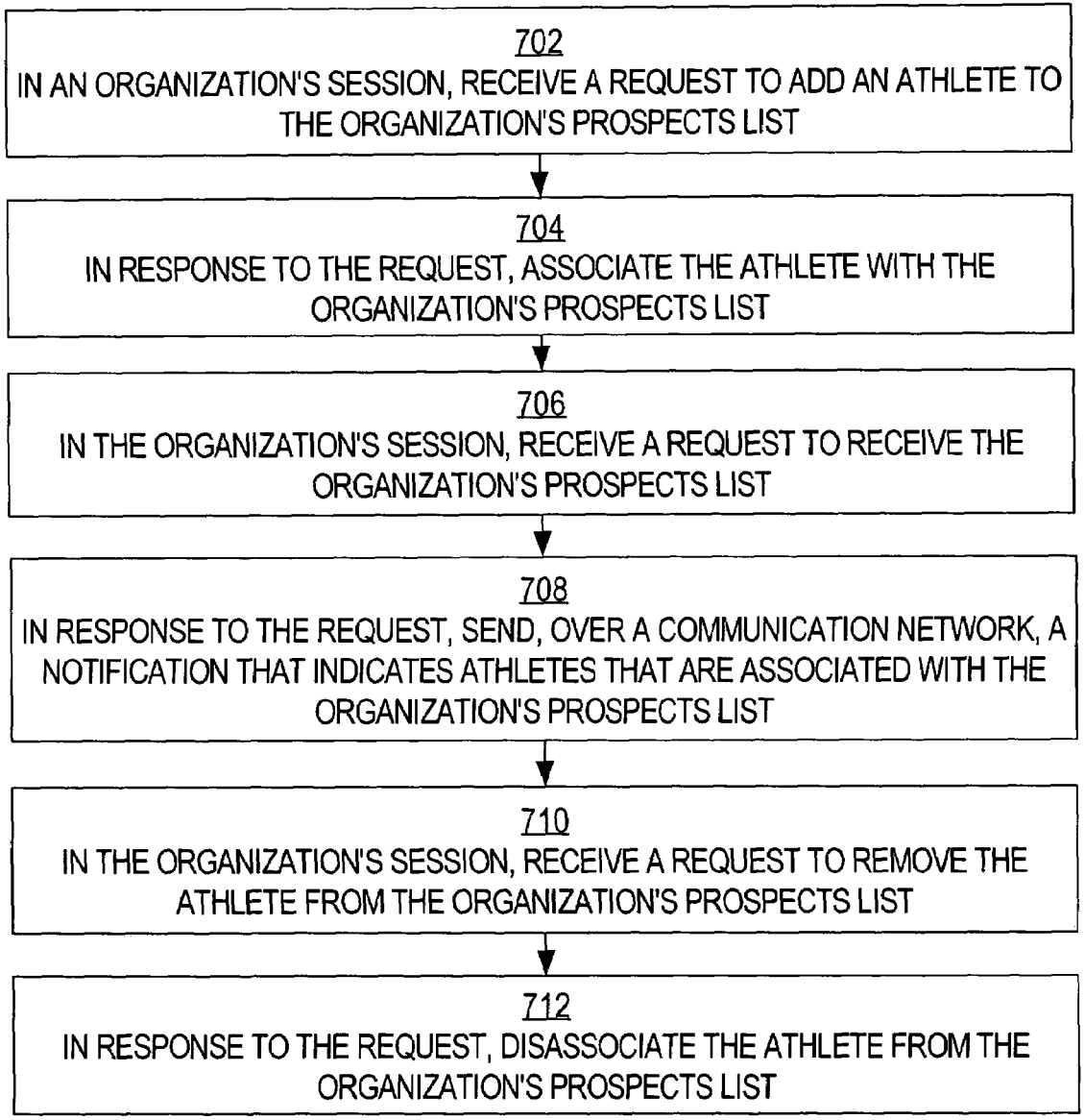
FIG. 7 is a flow diagram that depicts an approach for adding an athlete to an organization's prospects list, sending the organization's prospects list, and removing the athlete from the organization's prospects list, in accordance with an embodiment of the invention.

FIG. 7 is a flow diagram 700 that depicts an approach for adding an athlete to an organization's prospects list, sending the organization's prospects list, and removing the athlete from the organization's prospects list, in accordance with an embodiment of the invention. In block 702, a request to add an athlete to an organization's prospects list is received in the organization's session. For example, web server 106C may receive, from browser 112C, a request to add a first athlete to a first organization's prospects list. A first recruiter might cause browser 112C to send such a request to web server 106C by activating an "add to prospects" link displayed by browser 112C. The link may be displayed, for example, with the first athlete's information in the first athlete's profile.

Additionally, web server 106D may receive, from browser 112D, a request to add the first athlete to a second organization's prospects list. A second recruiter might cause browser 112D to send such a request to web server 106D by activating an "add to prospects" link displayed by browser 112D. The session associated with browser 112C may be associated with a first organization, while the session associated with browser 112D may be associated with a second organization that differs from the first organization.

Subsequently, web server 106C may receive, from browser 112C, a request to add a second athlete, different from the first athlete, to the first organization's prospects list. Thus, more than one athlete may be added to a particular organization's prospects list.

In one embodiment, profiles of athletes that are not currently associated with a particular organization's prospects list include an "add to prospects" link when displayed in the particular organization's session, while profiles of athletes that are currently associated with the particular organization's prospects list include a "remove from prospects" link when displayed in the particular organization's session. Because each organization is associated with a separate prospects list, a particular athlete may be associated with some organizations' prospects lists, and not associated with other organizations' prospects lists, at a particular moment.

In block 704, in response to receiving the request to add the athlete, the athlete is associated with the organization's prospect list. For example, in response to the receipt of the first's organization's request to add the first athlete to the first organization's prospects list, web server 106C may instruct database server 108C to establish, in database 110C, an association between the first athlete and the first organization. Responding to web server 106C, database server 108C may update a record associated with both the first organization and the first athlete in database 110C. The record indicates that the first athlete is contained in the first organization's prospects list. The others of databases 110A-N are similarly updated.

Additionally, in response to the receipt of the second organization's request to add the first athlete to the second organization's prospects list, web server 106D may instruct database server 108D to establish, in database 110D, an association between the first athlete and the second organization. Responding to web server 106D, database server 108D may update a record associated with both the second organization and the first athlete in database 110D. The record indicates that the first athlete is contained in the second organization's prospects list. The others of databases 110A-N are similarly updated.

Subsequently, in response to the receipt of the first organization's request to add the second athlete to the first organization's prospects list, web server 106C may instruct database server 108C to establish, in database 110C, an association between the second athlete and the first organization. Responding to web server 106C, database server 108C may update a record associated with both the first organization and the second athlete in database 110C. The record indicates that the second athlete is contained in the first organization's prospects list. The others of databases 110A-N are similarly updated.

In block 706, a request to receive the organization's prospects list is received in the organization's session. For example, web server 106C may receive, from browser 112C, a request to receive the first organization's prospects list. The first recruiter might cause browser 112C to send such a request to web server 106C by activating a "prospects" link displayed by browser 112C.

Additionally, web server 106D may receive, from browser 112D, a request to receive the second organization's prospects list. The second recruiter might cause browser 112D to send such a request to web server 106D by activating a "prospects" link displayed by browser 112D.

In block 708, in response to the request to receive the organization's prospects list, a notification is sent, over a communication network, to the organization. The notification indicates which athletes are associated with the organization's prospects list. For example, in response to the receipt of the first organization's request to receive the first organization's prospects list, web server 106C may instruct database server 108C to retrieve the names of the athletes that are associated with the first organization's prospects list. Responding to web server 106C, database server 108C may retrieve the desired names from database 110C and return the names to web server 106C. Receiving the names, web server 106C may send the names, over the Internet 102, to browser 112C. Browser 112C may display the names to the first recruiter.

Additionally, in response to the receipt of the second organization's request to receive the second organization's prospects list, web server 106D may instruct database server 108D to retrieve the names of the athletes that are associated with the second organization's prospects list. Responding to web server 106D, database server 108D may retrieve the desired names from database 110D and return the names to web server 106D. Receiving the names, web server 106D may send the names, over the Internet 102, to browser 112D. Browser 112D may display the names to the second recruiter.

In one embodiment, the notification includes a separate column for each team position. Each column includes the names of athletes that are associated with both the organization's prospects list and the team position corresponding to that column. For example, with reference to basketball, one column may include "forwards" that are associated with an organization's prospects list, while another column may include "centers" that are associated with the organization's prospects list. Each athlete's name may be a link that, when activated, causes a browser to request and display that athlete's information. Each such link also may include information other than an athlete's name, such as the athlete's year in school (e.g., freshman, sophomore, junior, or senior).

In block 710, a request to remove an athlete from the organization's prospects list is received in the organization's session. For example, web server 106C may receive, from browser 112C, a request to remove the first athlete from the first organization's prospects list. The first recruiter might cause browser 112C to send such a request to web server 106C by activating a "remove from prospects" link displayed by browser 112C. The link may be displayed, for example, with the athlete's information in the athlete's profile.

In block 712, in response to the request to remove the athlete, the athlete is disassociated from the organization's prospect list. For example, in response to the receipt of the first's organization's request to remove the first athlete from the first organization's prospects list, web server 106C may instruct database server 108C to remove, from database 110C, the association between the first athlete and the first organization. Responding to web server 106C, database server 108C may update the record associated with both the first organization and the first athlete in database 110C. The record then indicates that the first athlete is not contained in the first organization's prospects list. The others of databases 110A-N are similarly updated.

An athlete removed from one organization's prospects list may remain in another organization's prospects list. For example, the second athlete may remain in the first organization's prospects list even after the first athlete has been removed from the first organization's prospects list. Furthermore, because each organization's prospects list is separate, the first athlete may remain in the second organization's prospects list even after the first athlete has been removed from the first organization's prospects list. Although the examples above refer for sake of illustration to two athletes and two organizations, embodiments of the invention are not limited to any number of athletes or organizations.

XII. Notifying Athletes about Organizations Whose Prospects Lists Include the Athletes When an athlete is, or ever has been, associated with an organization's prospects list, it is a strong indication that the organization is, or at one time was, interested in the athlete. Therefore, in one embodiment, to encourage athletes to initiate contact with recruiters, the athlete recruiting system includes a mechanism that notifies an athlete about organizations that have added the athlete to a prospects list.

In one embodiment, the athlete recruiting system notifies an athlete about the identities of such organizations, but without disclosing the names of any individuals who participated in adding the athlete to the organizations' prospects lists. An athlete may discover the contact information of a recruiter associated with an organization by activating a link that identifies the organization.

FIG. 8 is a flow diagram 800 that depicts an approach for notifying an athlete about organizations that have associated the athlete with those organizations' prospects lists, in accordance with an embodiment of the invention. In block 802, an athlete is associated with an organization's prospects list. Such an associated may be established, for example, according to the approach described above with reference to flow diagram 700.

In one embodiment, each time that a particular athlete is associated with a particular organization's prospects list, a counter associated with both the particular athlete and the particular organization is incremented in databases 110A-N.

In block 804, in the athlete's session, a notification is sent. The notification indicates that the athlete has been associated with the organization's prospects list. For example, such a notification may be sent to a web browser in response to an athlete activating a "prospect list tracker" link in the web browser. Thus, to abide by NCAA rules, the notification may be sent in response to an athlete's inquiry rather than a recruiter's action. The notification is based on the association between the athlete and the organization's prospects list. The information indicated in the notification may be obtained from databases 110A-N.

For example, in the athlete's session, web server 106A may send, over the Internet 102 to browser 112A, a list of names of organizations whose prospects lists currently are associated with the athlete. Other information about listed organizations, such as the locations of the listed organizations (e.g., city and state), also may be sent.

In one embodiment, only organizations whose prospects lists currently are associated with an athlete are listed in the notification sent to the athlete. In an alternative embodiment, all organizations whose prospects lists ever have been associated with an athlete are listed in the notification sent to the athlete, even if those organizations' prospects lists currently are not associated with the athlete.

In one embodiment, the notification indicates, for each organization that ever has associated the athlete with that organization's prospects list, a number of times that the organization associated the athlete with that organization's prospects list. In an alternative embodiment, the notification omits this number.

Thus, to encourage an athlete to initiate contact with a recruiter, the recruiter and/or his staff may add the athlete to a prospects list without ever actually initiating contact with the athlete.

While in one embodiment the notification sent to an athlete comprises a web page requested by the athlete, in an alternative embodiment, the notification also or instead comprises an e-mail sent to the athlete's e-mail address in response to the activation of an "add to prospects" link displayed with the athlete's profile.

XIII. Public/Private Information and Invited Guest Accounts

For safety and privacy reasons, not all of an athlete's information should be displayed to the general public. Therefore, in one embodiment, some of an athlete's information is categorized as public information, and some of an athlete's information is categorized as private information. For example, an athlete's name, position, height, weight, and photograph may be categorized as public information, but an athlete's home address, telephone number, grade point average, and standardized test scores may be categorized as private information. To protect athletes, athletes' private information is not provided to sessions that are associated with a guest account. To enable recruiters to thoroughly evaluate athletes, athletes' public and private information is provided to sessions that are associated with an organization account.

An athlete might want selected friends and family, who do not have access to an organization account, to be able to view an athlete's complete information. Even so, the athlete might not want to enable his friends and family to update the athlete's information. Therefore, the athlete might not want to reveal to his friends and family the password associated with the athlete's athlete account.

In order to allow an athlete's selected friends and family to view the athlete's complete information without permitting the friends and family to update the athlete's information, in one embodiment, a special kind of account, called an "invited guest" account, may be established and associated with the athlete. An athlete's invited guest account is associated with a password that differs from the password associated with that athlete's athlete account. For example, an athlete's invited guest account may be associated with the same username as the athlete's athlete account, but the password for the invited guest account may be a substring of the password for the athlete account. An athlete may reveal the invited guest account password to anyone he chooses, by whatever means he chooses.

Those that access the athlete recruiting system through a session associated with an athlete's invited guest account can see the athlete's public and private information, but cannot update the athlete's information. Although those that access the athlete recruiting system through such a session can see that athlete's public and private information, they still cannot see the private information of other athletes.

XIV. Athletic Event Management

According to one embodiment, the athlete recruiting system includes a mechanism that allows associations to be established between athletic events and athletes that participated or will participate in the athletic events. In one embodiment, the athlete recruiting system includes a mechanism that allows associations to be established between athletic events, motion videos that represent the athletic events, and athletes that participated in the athletic events. Such associations may be established in databases 110A-N. Based on the associations, users of the athlete recruiting system can locate motion videos, athletic events, and athletes that are associated with each other.

A host or sponsor of an athletic event may register an athletic event with an organization that administers the athlete recruiting system ("the administrative organization"). For example, the host may be a high school at which a basketball game is going to be played. For another example, the host may be the administrative organization itself. The administrative organization may sponsor special athletic events to which athletes and/or teams may be invited. The administrative organization may collect certified athlete information at such special athletic events.

The administrative organization may collect information about the athletic event. For example, the administrative organization may collect information about where and when the athletic event has occurred or will occur. The administrative organization may collect information about the athletes that have participated or will participate in the athletic event. For example, the administrative organization may collect the names of the athletes that have participated or will participate in the athletic event. For each team that participates in an athletic event, the administrative organization may obtain a roster of athletes that are associated with that team. The administrative organization may provide this information collection service free of charge.

Prior to an upcoming registered athletic event, the administrative organization may store, in databases 110A-N, information about the athletic event. For example, the administrative organization may store the location, time, and date of the athletic event. The administrative organization may store the names of the teams that will participate in the athletic event. The administrative organization may store the names of the athletes that will participate in the athletic event. The administrative organization may store a digitized copy of the team rosters. The administrative organization may establish associations, in databases 110A-N, between the stored information items.

After the information about the athletic event has been stored in databases 110A-N, the athlete recruiting system may provide the information to users of the athlete recruiting system. For example, web server 106A may send, to browser 112A, a link associated with a particular athletic event. In response to the activation of the link, web server 106A may send, to browser 112A, a list of motion videos and athletes that are associated with the athletic event in databases 110A-N. Such a list may contain links to the motion videos and athlete profiles indicated.

After the administrative organization has collected information about the location, time, and date of a registered athletic event, an agent of the administrative organization may record motion videos at a registered athletic event. Once the motion videos have been recorded, the administrative organization may store the motion videos as part of video content 124. The administrative organization may provide this motion video recording service free of charge. Alternatively or additionally, the administrative organization may obtain and store motion videos that were recorded by others.

Once the motion videos have been stored in video content 124, the administrative organization may associate the motion videos with corresponding athletic events in databases 110A-N.

Athletes who desire to have their athlete information associated with the athletic event and/or the motion videos may pay a specified fee to the administrative organization. In response to receiving the specified fee from a particular athlete, the administrative organization may establish associations, in databases 110A-N, between the particular athlete's information and the athletic events in which the particular athlete or the particular athlete's team participated. Also in response to receiving the specified fee from a particular athlete, the administrative organization may establish associations, in databases 110A-N, between the particular athlete's information and the motion videos that feature the athlete or the athletic events in which the athlete or the athlete's team participated. In one embodiment, the administrative organization does not establish an association, in databases 110A-N, between an athlete's information and an athletic event or motion video until the athlete has supplied the specified fee to the administrative organization.

While in one embodiment the administrative organization establishes associations between an athlete's information and one or more motion videos and/or athletic events, in an alternative embodiment, the administrative organization grants an athlete privileges to establish associations between the athlete's information and an administrative organization-specified number of motion videos and/or athletic events. Thus, in one embodiment, an athlete who has supplied the specified fee may select the motion videos and/or athletic events with which the athlete wants to be associated. The athlete may make this selection over a communication network.

When an association is established between an athlete's information and a motion video, a record may be created in databases 110A-N. The record may indicate information that helps viewers of the motion video to identify the athlete within the motion video. For example, the record may indicate the color of the uniform worn by the athlete and/or the number on the uniform worn by the athlete. Either the athlete or the administrative organization may supply this information to the athlete recruiting system. Subsequently, the athlete recruiting system may provide this information to users.

In one embodiment, the athlete recruiting system includes, in an athlete's profile, links to athletic events and motion videos that are associated with the athlete's information. Furthermore, when the athlete recruiting system sends a motion video or information about an athletic event to a browser, the athlete recruiting system also may send links to the profiles of athletes that are associated with that motion video or athletic event. Consequently, an athlete is motivated to supply the specified fee to the administrative organization.

In one embodiment, the athlete recruiting system categorizes athletic events according to whether those athletic events already have occurred. As a result, upcoming athletic events may be listed separately from athletic events that already have occurred.

In one embodiment, the athlete recruiting system includes a feature that allows associations to be established between athletes and upcoming athletic events in which those athletes will participate. The administrative organization may establish an association between an athlete and an upcoming athletic event in exchange for the athlete providing a specified registration fee to the administrative organization. Once the association has been established, a recruiter or another athlete can determine the athletic events in which the registered athlete is going to participate. In some circumstances, such as when the athletic event is open to all athletes who want to participate, this feature may motivate more athletes to participate in the athletic event. This feature also allows recruiters to find out, before an athletic event, whether a specified athlete will participate in the athletic event.

In one embodiment, the athlete recruiting system allows associations to be established between recruiting entities, such as schools, and upcoming athletic events. Such associations may be established, for example, to indicate that a particular organization's recruiting agent will be in attendance at the athletic event.

FIG. 9 is a flow diagram 900 that depicts an approach for establishing an association between an athlete, an athletic event, and one or more motion videos, in accordance with an embodiment of the invention. In block 902, information about an athletic event is collected. In block 904, the information about the athletic event is stored in a database. In block 906, one or more motion videos of the athletic event are recorded. In block 908, the one or more motion videos are stored on a file server. In block 910, an association is established, in the database, between the athletic event and the one or more motion videos. In block 912, a specified fee is received from an athlete. In block 914, in response to receiving the specified fee, an association is established, in the database, between the athletic event, one or more of the motion videos, and the athlete's information.

XV. Motion Video Indexing

A recruiter may request a motion video from the athlete recruiting system by activating, in a browser resident on the recruiter's client machine, a link that is associated with the motion video. In response to the activation of the link, a stream server may upload or stream the motion video to the recruiter's client machine. Simultaneously or subsequently, a video player resident on the recruiter's client machine may play the motion video. By viewing a motion video that is associated with an athlete, the recruiter is better able to evaluate the athlete's performance and decide whether to attempt to recruit the athlete.

However, motion videos often contain more information than a recruiter wants to see. If a recruiter is interested in a particular athlete, then the recruiter might want to see only those portions of a motion video that actually show the particular athlete performing. The recruiter might want to show only those portions to his staff. A recruiter might review a motion video several times while evaluating an athlete's performance. If the recruiter is repeatedly forced to fast-forward to the interesting portions, the recruiter may become frustrated.

Additionally, motion videos sometimes contain more information than an athlete would like for a recruiter to see. An athlete might want to direct a recruiter to the best aspects of the athlete's performance captured in a motion video.

Therefore, in one embodiment, the athlete recruiting system provides a motion video indexing mechanism that allows both recruiters and athletes to generate and store sets of one or more starting and stopping timestamp pairs that may be associated with a motion video. Each pair of starting and stopping timestamps defines a separate time interval within a motion video. When a video player plays a version of a motion video that is associated with a set of timestamp pairs, the video player may skip portions of the motion video that do not occur during the time intervals defined by the timestamp pairs in the set. Additionally or alternatively, when a stream server uploads or streams a version of a motion video that is associated with a set of timestamp pairs, the stream server may skip portions of the motion video that do not occur during the time intervals defined by the timestamp pairs in the set.

More than one set of timestamp pairs may be associated with a particular motion video. For example, two different athletes may associate two different sets of timestamp pairs with the same motion video. For another example, two different recruiters also may associate two more different sets of timestamp pairs with that motion video. Because each user of the athlete recruiting system may be interested in seeing or showing different portions of a motion video, the athlete recruiting system allows, in one embodiment, multiple sets of timestamp pairs to be associated with the same motion video. In one embodiment, a user may associate multiple separate sets of timestamp pairs with the same motion video.

Associations between sets of timestamp pairs, user accounts, athlete identifiers, and motion videos may be stored in databases 110A-N. Each such association may indicate a separate tuple that includes: a set of timestamp pairs, an account identifier of the user that generated the set of timestamp pairs, an identifier of an athlete featured in the time intervals defined by the set of timestamp pairs, a file/path identifier for the motion video, and a description supplied by the user that generated the set of timestamp pairs.

When a recruiter or other user requests a motion video, the user may select, from among multiple versions of the motion video that are associated with different sets of timestamp pairs, a particular version that is associated with a particular set of timestamp pairs. The recruiter or other user may select the particular version based on the descriptions associated with different versions.

In one embodiment, the athlete recruiting system includes a mechanism that allows users to establish and store logical groups of motion videos. For example, an athlete might create a new logical group and identify three different motion videos that are to be associated with the logical group. As a result, an association may be established, in databases 110A-N, between the identified motion videos, the logical group, and the athlete. A user, such as a recruiter or athlete, may be associated with multiple different logical groups of motion videos.

Additionally, in one embodiment, the athlete recruiting system includes a mechanism that allows a user to index a logical group of motion videos in the same manner that the user can index a single motion video. A set of timestamp pairs and corresponding motion videos may be associated with a logical group that contains those motion videos. For example, a logical group might be associated with two timestamp pairs for a first motion video, five timestamp pairs for a second motion video, and three timestamp pairs for a third motion video. Thus, in one embodiment, requests to "play" a logical group that is associated with a set of timestamp pairs cause only specified portions of the logical group's motion videos to be played. For example, if the logical group described in the example above were "played," then two portions of the first motion video, five portions of the second motion video, and three portions of the third motion video would be played.

An indexed logical group may be associated with a user-supplied name. For example, if an athlete indexed a logical group so that each specified portion of the logical group's motion videos represented a long pass, then the athlete might associate that indexed logical group with the name "long passes." In one embodiment, the athlete recruiting system represents indexed logical groups to users as though those indexed logical groups were single motion videos.

FIG. 10 is a block diagram that depicts a functional layout of a user interface 1000 that allows an athlete to index motion videos, in accordance with an embodiment of the invention. User interface 1000 comprises an associated video list 1002, an "add video" control 1004, a playback object 1006, playback controls 1008, video indexing controls 1010, a video playback list 1012, a current play list 1014, and a "save" control 1016. User interface 1000 may be generated, for example, by web server 106A, which may send the user interface over the Internet 102 to browser 112A, which may display the user interface to an athlete.

Associated video list 1002 indicates names and/or descriptions of one or more motion videos that an athlete selected from a catalog of motion videos. According to one embodiment of the invention, the athlete recruiting system includes a mechanism that displays one or more names and/or descriptions of motion videos that are contained in video content 124. The mechanism allows a user, such as an athlete, to select one or more of the motion videos. The names and/or descriptions of the selected motion videos appear in associated video list 1002. In one embodiment, the motion videos named and/or described in associated video list 1002 are the motion videos that are associated with the athlete's information in databases 110A-N.

A user may select a particular motion video from among the motion videos that are indicated in associated video list 1002 by activating a control associated with the particular motion video. For example, a user may select a particular motion video by clicking on the name of the particular motion video as shown in associated video list 1002. A motion video selected in this manner is loaded and played in playback object 1006.

"Add video" control 1004 is a control (e.g., a link or button) that, when activated by a user, causes a catalog of motion videos to be presented to the user. The user may select one or more motion videos from the catalog by name and/or description. Once the user has selected one or more motion videos form the catalog, the names and/or descriptions of the selected motion videos are added to associated video list 1002.

Playback object 1006 is an embedded media playback object that is capable of playing a motion video. For example, playback object 1006 may be implemented as a Java plug-in component. Playback object 1006 may be capable of playing audio that is associated with a motion video. As used herein, "playing" a motion video comprises displaying, in sequence, multiple video frames of the motion video.

Playback object 1006 may be resizable to accommodate motion videos of varying frame dimensions. The size of playback object 1006 may be selected from a set of multiple available sizes. Once a size has been selected from the set of available sizes, the selected size may be stored and subsequently retrieved whenever user interface 1000 is displayed. For example, the selected size may be stored as a "cookie" of a browser. For another example, the selected size may be stored in association with a user account in databases 110A-N.

Playback controls 1008 include user-selectable controls for navigating forward and backward through the sequence of video frames contained in the motion video currently loaded in playback object 1006. For example, playback controls 1008 may include a "play" control, a "pause" control, a "stop" control, a "rewind" control, a "fast forward" control, a "slow motion" control, and/or other controls. Each such control may be displayed as a button with standard symbols familiar to users of video players of all sorts. Activating a control causes the functionality associated with that control to be applied to the motion video currently loaded in playback object 1006.

Video indexing controls 1010 include user-selectable controls for indicating starting and stopping timestamps that define time intervals within the currently loaded motion video. For example, video indexing controls 1010 may include a "start" button, a "stop" button, a text input field, and/or other controls.

Each frame of a motion video is associated with an elapsed time. For example, the frame that would be displayed 18.55 seconds after the first frame of the motion video was displayed (assuming that the motion video was played without interruption) is associated with an elapsed time of 18.55 seconds. Activating the "start" button causes a current starting timestamp to be set to the elapsed time associated with the frame currently displayed in playback object 1006. Activating the "stop" control causes a current stopping timestamp to be set to the elapsed time associated with the frame currently displayed in playback object 1006. The "stop" control of video indexing controls 1010 differs from the "stop" control of playback controls 1008 in both appearance and functionality.

The text input field of video indexing controls 1010 accepts alphanumeric input from a user. An athlete may enter a description in the text input field. An association between the description and the motion video portion defined by the current starting and stopping timestamps may be established in databases 110A-N. The association may be established when the athlete activates an "add" control of current play list 1014, described below. The description might include, for example, the athlete's uniform color and uniform number as shown in the motion video.

Current play list 1014 includes an "add" control, a "delete" control, and a list of motion video portions. Each such motion video portion is associated with a motion video, a starting timestamp position within that motion video, and an ending timestamp position within that motion video.

If a user activates the "add" control of current play list 1012, then the name of the current motion video portion, described by the text in the text input field, is added to current play list 1014. The current motion video portion is defined by the current starting and stopping timestamps selected using video indexing controls 1010. In one embodiment, the "add" control of current play list 1012 is disabled unless the motion video currently loaded in playback object 1006 is included in associated video list 1002.

If a user activates the "delete" control of current play list 1014, then the motion video portion currently selected in current play list 1014 is removed from the current play list. If a logical group is currently selected in video playback list 1012, described below, then any association between the currently selected motion video portion and the currently selected logical group is eliminated from databases 110A-N.

Motion video portions indicated in current play list 1014 can be renamed in current play list 1014.

Video playback list 1012 indicates names of logical groups that are associated with the athlete to whom user interface 1000 is being displayed. When a user selects the name of a logical group (e.g., by clicking on the name of the logical group), descriptions of the motion video portions that are associated with the selected logical group are displayed in current play list 1014. Also, when a user selects the name of a logical group, the motion video portions associated with the selected logical group (as indicated in current play list 1014) are sequentially loaded and played in playback object 1006.

Video playback list 1012 also includes a "delete" control. When the "delete" control of video playback list 1012 is activated, the currently selected logical group is removed from the video playback list and from databases 110A-N.

The activation of "save" control 1016 causes data that defines the motion video portions indicated in current play list 1014 to be stored in databases 110A-N. If a logical group is currently selected in video playback list 1012, then an association is established between the motion video portions indicated in current play list 1014 and the logical group currently selected in video playback list 1012. In one embodiment, "save" control 1016 is disabled unless a change has been made to current play list 1014 since the last time that the "save" control was activated.

FIG. 12 is a flow diagram 1200 that depicts an approach for indexing a motion video for an athlete, in accordance with an embodiment of the invention. In block 1202, a request to index a motion video is received in an athlete's session. In block 1204, in response to the receipt of the request received in block 1202, a list of motion videos is sent.

In block 1206, a request to play a motion video selected from the list of motion videos is received. In block 1208, in response to the receipt of the request received in block 1206, the selected motion video is loaded and played.

In block 1210, a request to set a starting timestamp is received. In block 1212, in response to the receipt of the request received in block 1210, an elapsed time associated with a currently displayed frame of the selected motion video is stored as the starting timestamp.

In block 1214, a request to set a stopping timestamp is received. In block 1216, in response to the receipt of the request received in block 1214, an elapsed time associated with a currently displayed frame of the selected motion video is stored as the stopping timestamp.

In block 1218, a request to add, to a logical group, a motion video portion defined by the starting and stopping timestamps is received. In block 1220, in response to the receipt of the request received in block 1218, an association is established between the athlete, the starting timestamp stored in block 1212, the stopping timestamp stored in block 1216, the motion video loaded in block 1208, and the logical group.

In block 1222, a request to save the logical group is received. In block 1224, in response to the receipt of the request to save the logical group, the association established in block 1220 is stored in a database.

FIG. 11 is a block diagram that depicts a functional layout of a user interface 1100 that allows a recruiter to index motion videos, in accordance with an embodiment of the invention.

User interface 1100 comprises an athlete list 1102, an associated video list 1104, a playback object 1106, playback controls 1108, video indexing controls 1110, a recruiter name 1112, a recruiter's saved play list 1114, and a "save" control 1116. User interface 1010 may be generated, for example, by web server 106C, which may send the user interface over the Internet 102 to browser 112C, which may display the user interface to a recruiter.

User interface 1100 may be accessed in several different ways. For example, user interface 1100 may be accessed by activating a "video indexing" control on a page that includes two or more athlete names. Examples of such pages are: pages generated in response to an athlete search as described above, pages generated in response to the activation of a "qualifiers" link as described above, and pages generated in response to the activation of a "prospects" link as described above. For another example, user interface 1100 may be accessed by activating a "video indexing" control on a page that includes at least a portion of a specific athlete's information, such as the specific athlete's profile. For yet another example, user interface 1100 may be accessed by activating a link to a particular motion video or athletic event. The behavior of user interface 1100 may vary based on the method used to access the user interface.

If user interface 1100 was accessed from a page that included names of two or more athletes, then athlete list 1102 indicates the athlete names included in the page. If user interface 1100 was accessed from a page that included at least a portion of a specific athlete's information, then athlete list 1102 indicates the name of the specific athlete. If user interface 1100 was accessed by activating a link to particular motion video or athletic event, then, in one embodiment, athlete list 1102 indicates the names of the athletes that are associated with the particular motion video or athletic event in databases 110A-N. In an alternative embodiment, athlete list 1102 is not displayed if user interface 1100 was accessed in a manner unrelated to one or more athlete names.

A recruiter may select, one at a time, names of athletes indicated in athlete list 1102. When a particular athlete's name is selected in athlete list 1102, then associated video list 1104 is populated with (a) the names and/or descriptions of motion videos that are associated with the particular athlete, and (b) the names and/or descriptions of logical groups that are associated with the particular athlete. In associated video list 1104, motion videos may be visibly distinguished from logical groups. For example, the names and/or descriptions of motion videos may be displayed in a different color than the names and/or descriptions of logical groups.

Additionally, when a particular athlete's name is selected in athlete list 1102, then recruiter's saved play list 1114 is populated with the names and/or descriptions of motion video portions that are associated with both the particular athlete and the organization in whose session user interface 1100 is being presented. A technique through which a motion video portion may be associated with both an athlete and an organization is described below.

In one embodiment, associated video list 1104 indicates (a) the names and/or descriptions of motion videos that are associated with the athlete currently selected in athlete list 1102 (the "current athlete"), and (b) the names and/or descriptions of logical groups that are associated with the current athlete. In an alternative embodiment, associated video list is not displayed when user interface 1100 was accessed in a manner not specific to one or more athletes, such as when user interface 1100 was accessed in response to the activation of a link to a particular motion video or athletic event.

A user may select a particular motion video from among the motion videos that are indicated in associated video list 1104 by activating a control associated with the particular motion video. For example, a user may select a particular motion video by clicking on the name of the particular motion video as shown in associated video list 1104. A motion video selected in this manner is loaded and played in playback object 1106.

Playback object 1106, playback controls 1108, and video indexing controls 1110 are functionality similar to playback object 1006, playback controls 1008, and video indexing controls 1010, respectively, described above.

Recruiter name 1112 is an input field that accepts input from a user. A recruiter may enter his name into the input field. The recruiter name is associated with the current motion video portion. This feature allows different motion video portions to be associated with different users that are associated with the same organization, and allows others to determine which user defined a particular motion video portion.

Recruiter's saved play list 1114 indicates names and/or descriptions of motion video portions that are associated with both the current athlete and the organization in whose session user interface 1100 is being presented. Recruiter's saved play list 1114 includes an "add" control and a "delete" control.

If a user activates the "add" control of recruiter's saved play list 1114, then the name of the current motion video portion, described by the text in the text input field of video indexing controls 1110, is added to recruiter's saved play list 1114. The current motion video portion is defined by the current starting and stopping timestamps selected using video indexing controls 1110. Adding a motion video portion to recruiter's saved play list 1114 causes the motion video portion to be associated with both the current athlete, and the organization in whose session user interface 1100 is being presented.

Adding a motion video portion to recruiter's saved play list 1114 also causes the motion video portion to be added to the recruiter's organization's motion video portions list, discussed below. The organization's motion video portions list may be used to notify athletes about the organization's interest in those athletes, as discussed below.

If a user activates the "delete" control of recruiter's saved play list 1114, then the motion video portion currently selected in the recruiter's saved play list is removed from the recruiter's saved play list.

The activation of "save" control 1116 causes data that defines the motion video portions indicated in recruiter's saved play list 1114 to be stored in databases 110A-N. If an athlete is currently selected in athlete list 1102, then the motion video portions are associated with the currently selected athlete. Alternatively, if no athlete is currently selected in athlete list 1102, then the motion video portions may be associated with an athletic event that was selected in order to access user interface 1100. In one embodiment, "save" control 1116 is disabled unless a change has been made to recruiter's saved play list 1114 since the last time that the "save" control was activated.

Figure 13:
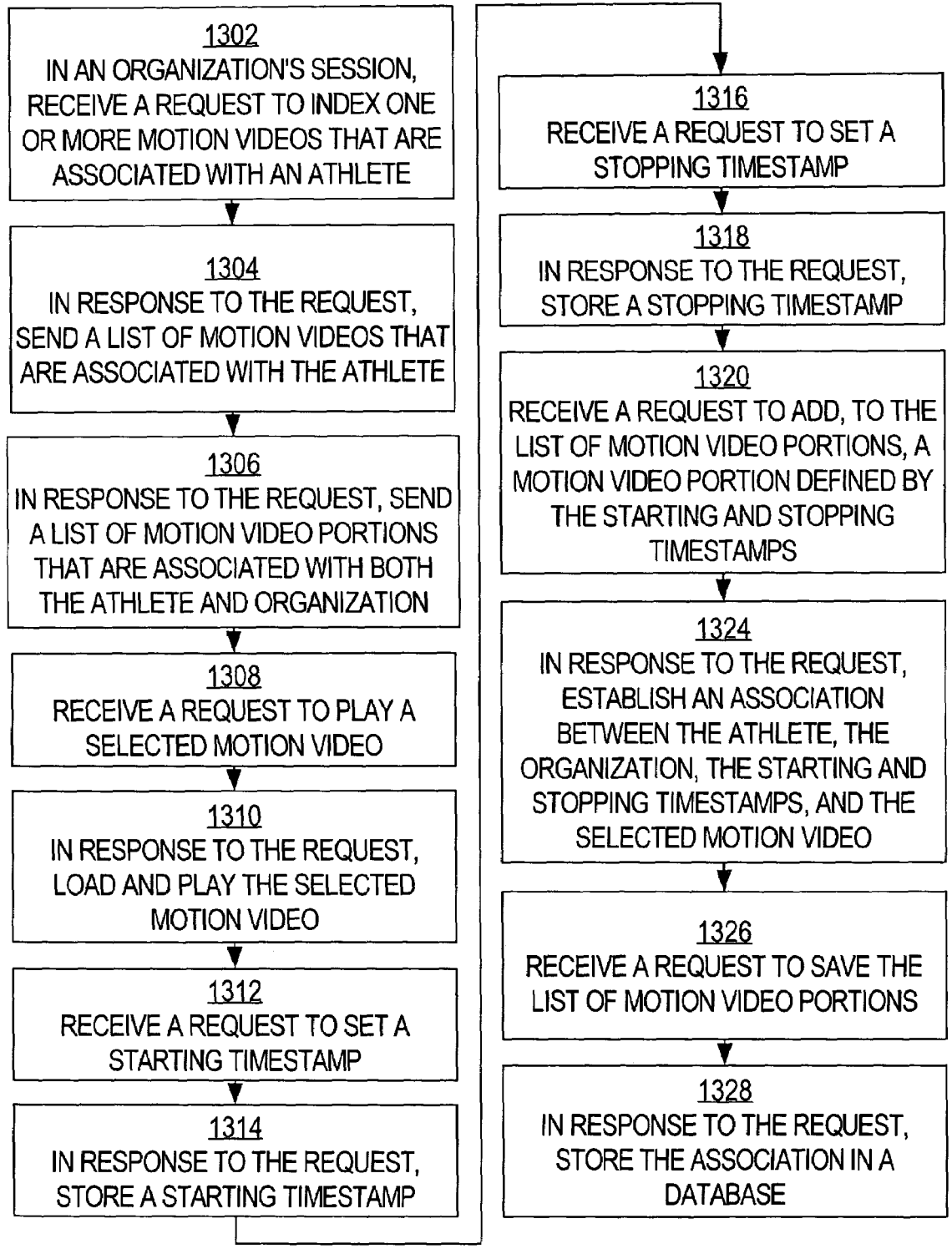
FIG. 13 is a flow diagram that depicts an approach for indexing a motion video for a recruiter, in accordance with an embodiment of the invention.

FIG. 13 is a flow diagram 1300 that depicts an approach for indexing a motion video for a recruiter, in accordance with an embodiment of the invention. In block 1302, a request to index one or more motion videos that are associated with an athlete is received in an organization's session. In block 1304, in response to the receipt of the request received in block 1302, a list of motion videos that are associated with the athlete is sent. Also, in block 1306, in response to the receipt of the request received in block 1302, a list of motion video portions that are associated with both the athlete and the organization is sent.

In block 1308, a request to play a motion video selected from the list of motion videos is received. In block 1310, in response to the receipt of the request received in block 1308, the selected motion video is loaded and played.

In block 1312, a request to set a starting timestamp is received. In block 1314, in response to the receipt of the request received in block 1312, an elapsed time associated with a currently displayed frame of the selected motion video is stored as the starting timestamp.

In block 1316, a request to set a stopping timestamp is received. In block 1318, in response to the receipt of the request received in block 1316, an elapsed time associated with a currently displayed frame of the selected motion video is stored as the stopping timestamp.

In block 1320, a request to add, to the list of motion video portions, a motion video portion defined by the starting and stopping timestamps is received. In block 1322, in response to the receipt of the request received in block 1320, an association is established between the athlete, the organization, the starting timestamp stored in block 1314, the stopping timestamp stored in block 1318, and the motion video loaded in block 1310.

In block 1324, a request to save the list of motion video portions is received. In block 1326, in response to the receipt of the request received in block 1324, the association established in block 1322 is stored in a database.

XVI. Notifying Athletes about Organizations that Have Indexed Motion Videos Associated with the Athletes When a recruiter adds, to recruiter's saved play list 1114, a portion of a motion video that is associated with an athlete, as described above, it is a strong indication that the recruiter is interested in the athlete. Therefore, in one embodiment, to encourage athletes to initiate contact with recruiters, the athlete recruiting system includes a "video indexing hit tracking" mechanism that notifies an athlete about organizations that have added, to the recruiter's saved play list, a portion of a motion video that is associated with the athlete.

In one embodiment, the athlete recruiting system notifies an athlete about the identities of such organizations, but without disclosing the names of any individuals who participated in adding the motion video portions to the recruiter's saved play list. An athlete may discover the contact information of a recruiter associated with an organization by activating a link that identifies the organization.

FIG. 14 is a flow diagram 1400 that depicts an approach for notifying an athlete about organizations that have added, to the organization's list of motion video portions, portions of motion videos that are associated with the athlete, in accordance with an embodiment of the invention.

In block 1402, an association is established between an athlete, an organization, a starting and stopping timestamp, and a motion video. Such an association may be established, for example, according to the approach described above with reference to flow diagram 1300. Establishing this association adds a portion of a motion video that is associated with the athlete to the organization's list of motion video portions.

In one embodiment, each time that a portion of a motion video that is associated with a particular athlete is added to a particular organization's motion video portions list, a counter associated with both the particular athlete and the particular organization is incremented in databases 110A-N.

In block 1404, in the athlete's session, a notification is sent. The notification indicates that a portion of a motion video that is associated with the athlete has been added to the organization's motion video portions list. For example, such a notification may be sent to a web browser in response to an athlete activating a "video hit tracker" link in the web browser. Thus, to abide by NCAA rules, the notification may be sent in response to an athlete's inquiry rather than a recruiter's action. The information indicated in the notification may be obtained from databases 110A-N.

For example, in the athlete's session, web server 106A may send, over the Internet 102 to browser 112A, a list of names of organizations whose motion video portions lists currently contain at least one portion of a motion video that is associated with the athlete. Other information about listed organizations, such as the locations of the listed organizations (e.g., city and state), also may be sent.

In one embodiment, only organizations whose motion video portions lists currently include at least one portion of a motion video associated with the athlete are listed in the notification sent to the athlete. In an alternative embodiment, all organizations whose motion video portions lists ever have included at least one portion of a motion video associated with the athlete are listed in the notification sent to the athlete, even if those organizations' motion video portions lists currently do not include any portion of a motion video associated with the athlete.

In one embodiment, the notification indicates, for each organization whose motion video portions list ever has included at least one portion of a motion video associated with the athlete, a number of times that the organization added a portion of a motion video associated with the athlete to that organization's motion video portions list. Thus, the athlete may be notified about how many portions of motion videos associated with the athlete have been added to an organization's motion video portions list. In an alternative embodiment, the notification omits this number.

Thus, to encourage an athlete to initiate contact with a recruiter, the recruiter and/or his staff may add a portion of a motion video associated with the athlete to the recruiter's organization's motion video portions list without ever actually initiating contact with the athlete.

While in one embodiment the notification sent to an athlete comprises a web page requested by the athlete, in an alternative embodiment, the notification also or instead comprises an e-mail sent to the athlete's e-mail address in response to the addition of a portion of a motion video associated with the athlete to a organization's motion video portions list.

XVII. Motion Video Content Categorization

According to one embodiment, motion videos added to video content 124 are categorized by type. For example, a motion video may be categorized as a complete sporting event, a drill, an interview, or a musculoskeletal presentation. The category to which each motion video belongs may be indicated in databases 110A-N. As a result, when descriptions of motion videos associated with an athlete are listed as a part of that athlete's information, the descriptions may indicate the categories to which the motion videos belong. This enables a recruiter to view the types of motion videos in which he is most interested.

In one embodiment, each motion video may be associated with the following information in databases 110A-N: a date, a sport (e.g., football, basketball, etc.), one or more organization names, one or more team names, a city, a state, a scholastic level (e.g., junior high school, high school, college), a division, and/or a conference. The athlete recruiting system may provide a mechanism that allows a user to sort and filter a list of motion videos based on this information and user-specified criteria. The administrative organization may establish the associations between motion videos and the information described above.

XVIII. Single System for Multiple Sports

The athlete recruiting system described herein is not limited to a single sport. Within the system, different athlete accounts can be associated with different sports. For example, one athlete account may be associated with football, another athlete account may be associated with basketball, and yet another athlete account may be associated with baseball. An athlete account for a particular sport is associated with information that is specific to that sport. For example, an athlete account that is associated with basketball may be associated with a free throw percentage and a vertical jump height; such basketball-specific information typically would not be relevant to sports other than basketball.

Because the athlete recruiting system can store information pertaining to multiple sports, organizations can access the same system for all of their sports recruiting needs. This is much more convenient than accessing multiple different systems for different sports.

The athlete recruiting system described herein is also capable of storing information pertaining to both male and female athletes. Thus, organizations' men's and women's athletic departments both can use the same system for recruiting athletes.

XIX. Implementation Mechanisms, Alternatives & Extensions

The approach described herein for recruiting athletes is applicable to a variety of contexts and implementations and is not limited to a particular context or implementation. For example, as used herein, organizations include recruiting entities such as colleges, universities, professional sports teams, semi-professional sports teams, apparel companies, scouting groups, marketing companies, sports agents groups, etc. Although approaches described herein are applicable to schools, approaches described herein are equally applicable to recruiting entities other than schools. Recruiting entities include entities that recruit athletes, but approaches described herein may be used to recruit individuals other than athletes. For example, approaches described herein may be used by business organizations to recruit employees.

Figure 15:
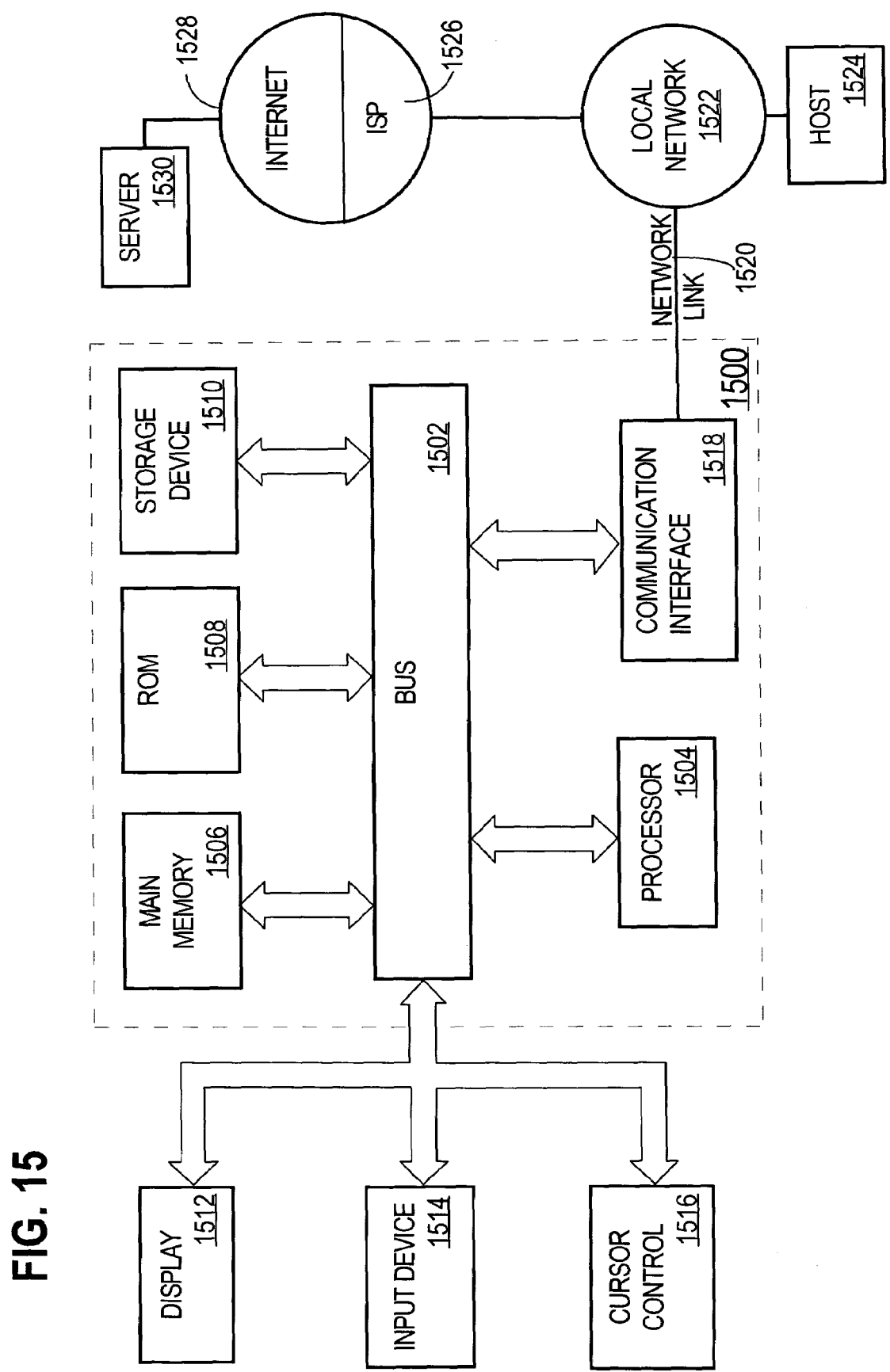
FIG. 15 is a block diagram that illustrates a computer system upon which an embodiment of the invention may be implemented.

FIG. 15 is a block diagram that illustrates a computer system 1500 upon which an embodiment of the invention may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

The invention is related to the use of computer system 1500 for implementing the techniques described herein. According to one embodiment of the invention, those techniques are performed by computer system 1500 in response to processor 1504 executing one or more sequences of one or more instructions contained in main memory 1506. Such instructions may be read into main memory 1506 from another machine-readable medium, such as storage device 1510. Execution of the sequences of instructions contained in main memory 1506 causes processor 1504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1500, various machine-readable media are involved, for example, in providing instructions to processor 1504 for execution. Such a medium may take many forms, including but not limited to, non-volatile media, volatile media, and transmission media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution. In this manner, computer system 1500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for indexing motion video, the method comprising the machine-implemented steps of:

storing a motion video file that represents an athletic event that was recorded by an agent of an administrative organization;

receiving, through a network communication link, from an athlete that participated in the athletic event, first data that indicates a first sub-segment of the motion video file;

in response to receiving the first data storing a first association between the motion video file and the first data on a particular non-volatile or volatile computer-readable medium;

sending, through a network communication link, to a potential recruiter of the athlete, only portions of the motion video file that correspond to the first sub-segment;

receiving, through a network communication link, from the potential recruiter, second data that indicates a second sub-segment of the first sub-segment; and in response to receiving the second data, storing, on the particular non-volatile or volatile computer-readable medium an association between the motion video file, the second data, and the potential recruiter.

2. A volatile or non-volatile machine-readable medium for indexing motion video, the machine-readable medium storing one or more sequences of instructions which, when executed by one or more processors, cause the one or more processors to perform the steps of:

storing a motion video file that represents an athletic event that was recorded by an agent of an administrative organization;

receiving, through a network communication link, from an athlete that participated in the athletic event, first data that indicates a first sub-segment of the motion video file;

in response to receiving the first data storing a first association between the motion video file and the first data on a particular non-volatile or volatile computer-readable medium;

sending, through a network communication link, to a potential recruiter of the athlete, only portions of the motion video file that correspond to the first sub-segment;

receiving, through a network communication link, from the potential recruiter, second data that indicates a second sub-segment of the first sub-segment; and in response to receiving the second data, storing, on the particular non-volatile or volatile computer-readable medium an association between the motion video file, the second data, and the potential recruiter.

3. An apparatus for indexing motion video, the apparatus comprising a memory carrying one or more sequences of instructions which, when executed by one or more processors, cause the one or more processors to perform the steps of:

storing a motion video file that represents an athletic event that was recorded by an agent of an administrative organization;

receiving, through a network communications link, from an athlete that participated in the athletic event, first data that indicates a first sub-segment of the motion video file;

in response to receiving the first data, storing a first association between the motion video file and the first data on a particular non-volatile or volatile computer-readable medium;

sending, through a network communication link, to a potential recruiter of the athlete, only portions of the motion video file that correspond to the first sub-segment;

receiving, through a network communication link, from the potential recruiter, second data that indicates a second sub-segment of the first sub-segment; and in response to receiving the second data, storing, on the particular non-volatile or volatile computer-readable medium an association between the motion video file, the second data, and the potential recruiter.

* * * * *